US012645528B2

(12) United States Patent
Goyal et al.

(10) Patent No.:     US 12,645,528 B2
(45) Date of Patent:     Jun. 2, 2026

(54) SINGLE SIGNAL DEBUG PORT

(71) Applicant: STMicroelectronics International N.V., Geneva (CH)

(72) Inventors: Avneep Kumar Goyal, Greater Noida (IN); Thomas Szurmant, Munich (DE)

(73) Assignee: STMicroelectronics International N.V., Geneva (CH)

( * ) Notice: Subject to any disclaimer, the term of this patent is extended or adjusted under 35 U.S.C. 154(b) by 23 days.

(21) Appl. No.: 18/911,745

(22) Filed: Oct. 10, 2024

(65) Prior Publication Data

US 2025/0036518 A1     Jan. 30, 2025

Related U.S. Application Data

(63) Continuation of application No. 18/122,420, filed on Mar. 16, 2023.

(51) Int. Cl.
  *G06F 11/00*     (2006.01)
  *G06F 1/08*     (2006.01)
  *G06F 11/07*     (2006.01)
(52) U.S. Cl.
  CPC ............ *G06F 11/0793* (2013.01); *G06F 1/08* (2013.01); *G06F 11/0745* (2013.01)
(58) Field of Classification Search
  CPC ............ G06F 11/0793; G06F 11/0745; G06F 11/3466; G06F 11/3656; G06F 11/348; G06F 1/08
  See application file for complete search history.

(56) References Cited

U.S. PATENT DOCUMENTS 7,412,633 B2     8/2008 Kimelman et al.
9,140,753 B2     9/2015 Hopkins et al.
(Continued)

FOREIGN PATENT DOCUMENTS

CN     107622010 A     1/2018
CN     114872674 A  *  8/2022  .............. B60T 17/18
(Continued)

OTHER PUBLICATIONS

Extended European search report, EP Application No. 24159922.4, dated Jul. 18, 2024, 8 pages.
(Continued)

*Primary Examiner* — Katherine Lin
(74) *Attorney, Agent, or Firm* — Slater Matsil, LLP

(57)     ABSTRACT

According to an embodiment, a system is provided that includes a debugging tool and an application board. The debugging tool includes a serial wire debug (SWD) host coupled to a single signal debug port (SSDP) host. The application board includes an SWD target coupled to an SSDP target. The SWD target is configured to communicate SWD signals with the SWD host. The SSDP target is configured to encode the SWD signals to SSDP signals for communication over a Controller Area Network (CAN) Bus between the application board and the debugging tool. The SSDP signals are pulse-width modulation (PWM) encoded signals of the SWD signals. An SWD clock signal generated by the SWD host is the carrier signal for the PWM encoded signals. The SSDP target is configured to decode the SSDP signals received from the SSDP host over the CAN Bus to the SWD signals.

20 Claims, 9 Drawing Sheets

(56) References Cited

U.S. PATENT DOCUMENTS

| | | | |
|---|---|---|---|
| 9,274,169 | B2 | 3/2016 | Lingannagari et al. |
| 9,632,137 | B2 | 4/2017 | Ramsay et al. |
| 10,310,012 | B2 | 6/2019 | Rubin et al. |
| 10,845,413 | B2 | 11/2020 | Menon et al. |
| 2010/0229038 | A1 | 9/2010 | Mayer et al. |
| 2012/0022821 | A1 | 1/2012 | Dembiczak et al. |
| 2014/0013011 | A1 | 1/2014 | Hopkins |
| 2015/0046763 | A1 | 2/2015 | Makar et al. |

FOREIGN PATENT DOCUMENTS

| | | | | |
|---|---|---|---|---|
| CN | 115185776 A | 10/2022 | | |
| KR | 20120057860 A | * 6/2020 | ........... | G01R 31/343 |

OTHER PUBLICATIONS

Unkown, "Debugger for Armv8/Armv9 via SSDP (PACK)," Lauterback, Aug. 31, 2022, https://www.lauterbach.com/, 3 pages (Year: 2022).

* cited by examiner

700

702 SWD CLOCK SIGNAL

704 SWD DATA LINE SIGNAL IN SWD HOST/TARGET

706 SWD DATA LINE SIGNAL IN APPLICATION BOARD

708 CAN BUS SIGNAL

710 SWD CLOCK SIGNAL FROM SSDP TARGET

712 SWD DATA LINE SIGNAL (SWDI OUT)

714 SWD ENABLE SIGNAL (SWD0_EN)

716 SWD DATA LINE SIGNAL (SWD0)

718 SSDP SIGNAL (SSDP_OUT)

$T_0$     $T_1$     $T_2$

900

902 — DETECTION SEQUENCE

904 — RESPONSE SEQUENCE

906 — ACKNOWLEDGE OF RESPONSE SEQUENCE

908 — ENCODE DATA

910 — COMMUNICATE ENCODED DATA

912 — DECODE DATA

SINGLE SIGNAL DEBUG PORT

CROSS-REFERENCE TO RELATED APPLICATIONS

This application is a continuation of U.S. application Ser. No. 18/122,420, filed on Mar. 16, 2023, which application is hereby incorporated by reference herein in its entirety.

TECHNICAL FIELD

The present disclosure generally relates to design for debug (DFD) and, in particular embodiments, to debugging a system-on-chip using a single signal debug port (SSDP).

BACKGROUND

In a typical automotive system, components are packaged within a rugged enclosure accessible through connectors. The connectors allow the components to communicate with other components using various communication interfaces (e.g., controller area network (CAN), local interconnect network (LIN), ethernet, etc.).

Debug interfaces are used, for example, during software development, system-level performance measurements, or programming of software code into, for example, on-chip flash or random-access memory (RAM). The debug interfaces are unlikely to be used when the vehicle is fully developed and ready to be deployed into the field. Due to specific use cases of the debug interfaces and pin limitation constraints within the connectors, allocating pins for debug interfaces is an unwanted overhead to overall system cost and generally undesirable.

Conventionally, a dedicated pin is used to force the interface into the debug interface configuration, where it is possible to map debug interfaces to a set of general-purpose input/output (GPIO) pins. Thus, the debugger drives this additional pin to, for example, a logic high to force the GPIO pins to move into the debug interface configuration. Disadvantageously, allocating extra I/O is generally undesirable due to pin limitation constraints. Further, in a typical system, where more than one communication interface is mapped onto the same set of GPIO pins, which also has the mapping of the debug interface, the mapped communication protocol cannot be used when the debugger is connected.

Thus, an improved system, circuit, and method to debug a system-on-chip are desirable.

SUMMARY

Technical advantages are generally achieved by embodiments of this disclosure which describe a single signal debug port for debugging a system-on-chip.

A first aspect relates to a circuit that includes a serial wire debug (SWD) target circuit and a single signal debut port (SSDP) target circuit. The SWD target is configured to communicate SWD signals with an SWD host of a debugging tool. The SSDP target circuit is coupled to the SWD target circuit. The SSDP target circuit is configured to encode the SWD signals to SSDP signals for communication over a Controller Area Network (CAN) Bus between the circuit and the debugging tool. The SSDP signals are pulse-width modulation (PWM) encoded signals of the SWD signals. An SWD clock signal generated by the SWD host is the carrier signal for the PWM encoded signals. The SSDP target circuit is further configured to decode the SSDP signals received over the CAN Bus to the SWD signals.

A second aspect relates to a method. The method includes establishing a single signal debug port (SSDP) link between a single signal debug port (SSDP) host circuit and an SSDP target circuit; encoding SSDP signals by the SSDP host or the SSDP target from a serial wire debug (SWD) host circuit or an SWD target circuit, respectively, wherein the SSDP signals are pulse-width modulation (PWM) encoded signals of SWD signals, wherein an SWD clock signal generated by the SWD host is the carrier signal for the PWM encoded signals; communicating the SSDP signals between the SSDP host circuit and the SSDP target circuit over a Controller Area Network (CAN) Bus; and decoding the SSDP signals, by the SSDP target circuit or the SSDP host circuit, to SWD signals.

A third aspect relates to a system that includes a debugging tool and an application board. The debugging tool includes a serial wire debug (SWD) host circuit and a single signal debug port (SSDP) host circuit coupled to the SWD host circuit. The application board includes an SWD target circuit and an SSDP target circuit. The SWD target circuit is configured to communicate SWD signals with the SWD host. The SSDP target circuit is coupled to the SWD target circuit. The SSDP target circuit is configured to encode the SWD signals to SSDP signals for communication over a Controller Area Network (CAN) Bus between the application board and the debugging tool. The SSDP signals are pulse-width modulation (PWM) encoded signals of the SWD signals. An SWD clock signal generated by the SWD host is the carrier signal for the PWM encoded signals. The SSDP target circuit is configured to decode the SSDP signals received from the SSDP host over the CAN Bus to the SWD signals.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
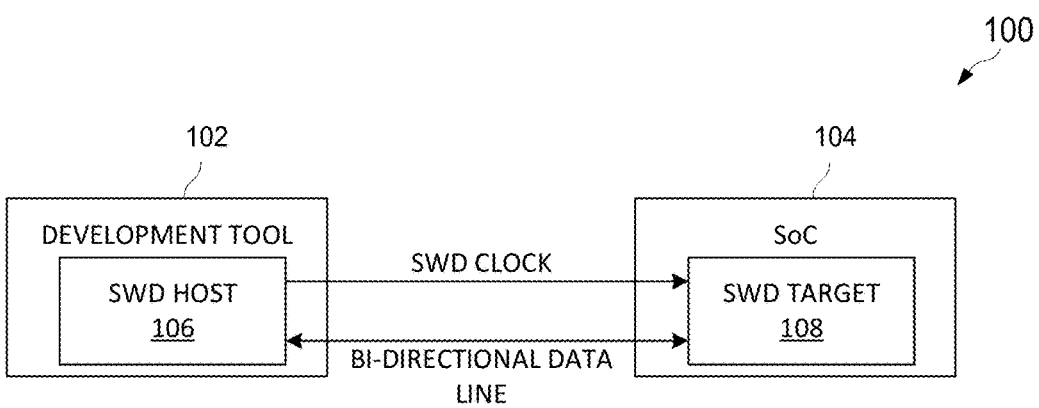
FIG. 1 is a block diagram of a system for debugging a system-on-chip through an SWD interface.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

The inventive aspects herein are described primarily in the context of a system-on-chip (SoC) used in an automotive system, such as the power train, body, chassis, advanced driver assistance (ADAS), or the like. However, the embodiments of this disclosure may similarly apply to any system-on-chip type device in any industry. For example, these inventive concepts provide advantages in any system-on-chip with limited debugging input/output (I/O) ports. Further, these embodiments may be used, in addition to within the automotive industry, in the aerospace, industrial, medical, and internet-of-things (IoT) fields.

Embodiments of this disclosure provide a new and improved protocol (i.e., single signal debug port (SSDP) protocol) for system-on-chip debugging using the Controller Area Network (CAN) Bus and interfaces. In various embodiments, the Wire-AND nature of the CAN Bus is used to transmit a pulse width modulation (PWM) encoded signal over the CAN Bus. The PWM encoded signal allows data to be transmitted using a single wire of the CAN Bus to support the two-wire serial wire debug (SWD) protocol. In these embodiments, the SWD protocol works as an upper link layer.

In an in-vehicle end-application, a CAN transceiver is already present. The differential CAN Bus signals are available on the Electronic Control Unit (ECU) connector, which is typically not the case for the I/O pins of a debug port. Automotive systems, which cannot afford debug port I/O's due to connector pin limitations, can support Single Signal Debug Port (SSDP) to debug the in-vehicle end-application over the conventional CAN-Bus using the available CAN transceiver and I/O's without using the CAN protocol.

The proposed SSDP protocol provides higher performance than the conventional solutions. For example, SSDP protocol requires only an initial overhead to establish the SSDP link between an SSDP host and an SSDP target. In contrast, the conventional solution requires multiple overheads at nearly every stage of communication. Further, as the SSDP protocol utilizes existing CAN I/O pins and is communicated over the existing CAN Bus, the proposed SSDP system can be implemented more compactly than the existing solutions, which typically require additional IP with a functional interface, additional data storage buffers, and multiple modifications to other IP.

The SSDP protocol is a fully defined end-to-end solution that does not interfere with the application-specific functions of the system-on-chip on which it is implemented. The SSDP protocol works with the debug test access port (TAP) to debug architecture requirements; thus, the protocol is transparent to the system-on-chip functional infrastructure. This, advantageously, allows debugging the system-on-chip without utilizing functional logic resources (i.e., non-debug logic).

Aspects of this disclosure provide an SSDP protocol that forces the CAN nodes of the system into a non-functional like Bus OFF state. The SSDP host and target generate PWM encoded data signal to transfer data between the SWD host and SWD target. The SWD Data signal is superimposed on its clock signal (i.e., the clock signal acts as a carrier for the PWM encoded signals).

In embodiments, unique sequences are disclosed, which are not available in normal CAN communication-removing any false detection of the activation sequence of the SSDP protocol. The activation sequence of the SSDP protocol is a full handshake using a response sequence followed by an acknowledge sequence. In embodiments, a unique reset sequence is added to reset the SSDP target. Upon the establishment of the SSDP link between the SSDP host and SSDP target, which acts as an intermediary between the SWD host and SWD target, the SWD data read and write transactions are exchanged between the debugger and the device under test (DUT) (e.g., system-on-chip) through PWM based encoding and decoding of the signals (based on the SSDP protocol) communicated over the single wire (or differential pair) of the CAN-Bus. These and further details are discussed in greater detail below.

FIG. 1 illustrates a block diagram of a system 100 for debugging a system-on-chip 104 through an SWD interface. System 100 includes a development tool 102 for debugging the system-on-chip 104 to which it is coupled through dedicated I/O pins (i.e., clock and bi-directional data pins). Development tool 102 includes an SWD host 106. The system-on-chip 104 (i.e., device under test (DUT)) includes the SWD target 108.

Development tool 102 (i.e., debugger) accesses the internals of the system-on-chip 104 via a debug interface, such as an SWD. Generally, the debug interface access IP supports these standard interfaces, and the development tool 102 selects the protocol type during the connection initialization process.

Generally, debug logic is present in all system-on-chips to, for example, support software development, system-level performance measurements, or programming of software code into, for example, on-chip flash or random-access memory (RAM).

The SWD protocol is a synchronous packet-based protocol specified by ARM Limited as an alternative to JTAG. SWD protocol uses fewer pins and is more robust due to parity checking and error management techniques. SWD protocol uses a clock signal generated by the host debug tool (e.g., SWD host 106) and a single bi-directional data line (i.e., serial data transmission is half-duplex). During debugging, the clock signal is provided to the SWD target 108 from the SWD host 106. It is noted that, as the SWD host 106 provides the clock signal, the clock signal follows a source synchronous I/O interface protocol.

It is desirable for the debug access port of the system-on-chip 104, which is connected through the SWD interfaces, to be available to the development tool 102 in the default configuration (i.e., without additional programming or alternate functions assigned to the I/O pins). However, this requirement adds constraints to the I/O pin selection because the debug interface(s) has to be mapped to the dedicated I/O pins and forced into a required configuration via a control signal sent by the development tool 102 when connected.

Figure 2:
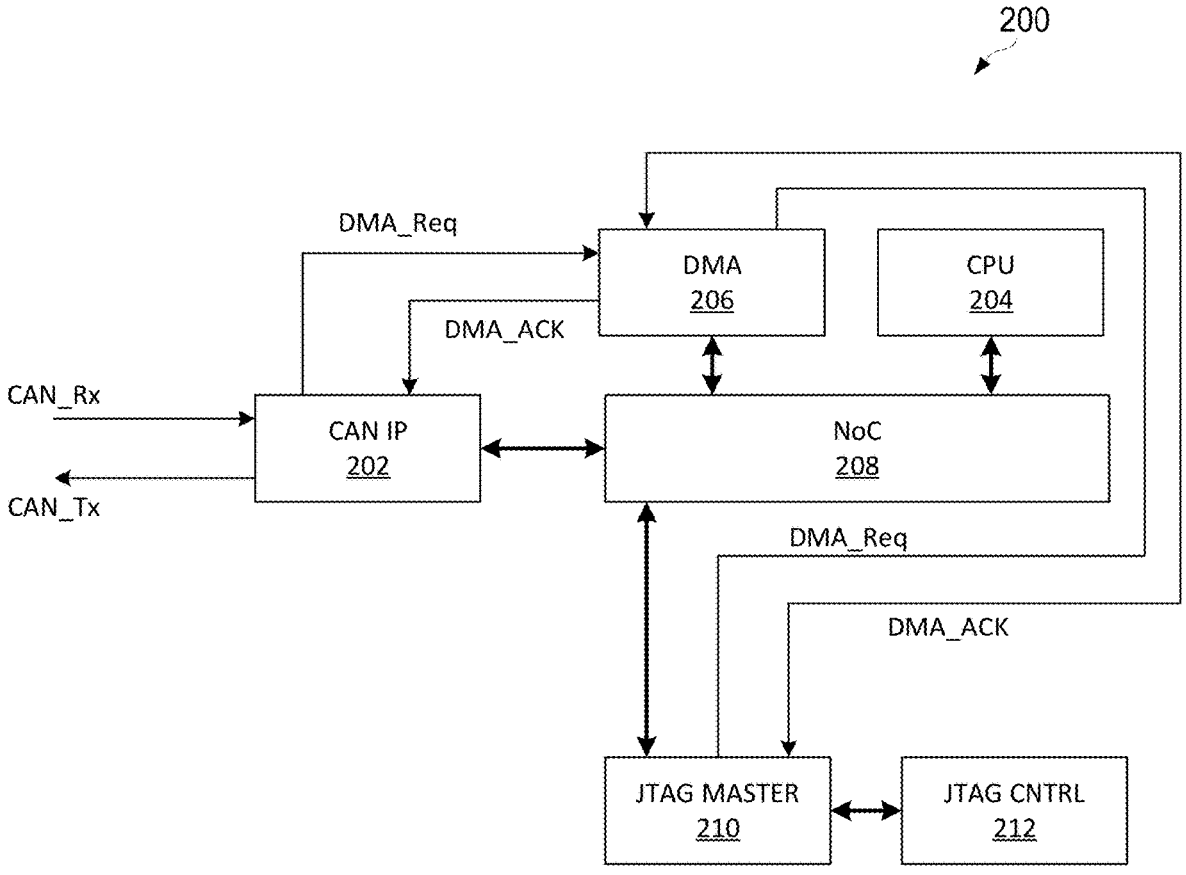
FIG. 2 is a block diagram of a system-on-chip that uses the JTAG interface for debugging.

FIG. 2 illustrates a block diagram of a system-on-chip 200 that uses the JTAG interface for debugging. System-on-chip 200 includes a CAN IP 202, a host CPU 204, a direct memory access (DMA) 206, a network-on-chip (NoC) 208, a JTAG master 210, and a JTAG controller 212. NoC 208 is used to communicate between the CAN IP 202, the host CPU 204, the DMA 206, and the JTAG master 210 through a data bus. JTAG master 210 is coupled to a JTAG controller 212.

In FIG. 2, CAN IP 202 receives (i.e., through the CAN_Rx path) and transmits (i.e., through the CAN_Tx path) debug-related messages between a debugger (e.g., development tool 102) and the system-on-chip 200. During a debug write operation, host CPU 204 initializes the CAN IP 202, the DMA 206, and the JTAG master 210 for debug-over-CAN use. The debugger sends debug messages over the CAN Bus using a CAN protocol to the system-on-chip 200. The debug messages are received by the CAN IP 202. CAN IP 202 sends a request for a DMA transfer (DMA_Req) to DMA 206. DMA 206 reads and transmits the debug messages to the JTAG master 210. The JTAG master 210 converts the debug messages into a custom-designed JTAG master IP as JTAG sequences. The JTAG controller 212 receives the JTAG sequences from the JTAG master 210 and generates data transaction sequences to the debug infrastructure of the system-on-chip 200.

During a debug read operation, data is provided to the debugger from the debug infrastructure to the JTAG controller 212. JTAG master 210 initiates a data read sequence. Upon completing the data read sequence, a DMA request is sent from the JTAG master 210 to the DMA 206. DMA 206 writes to the CAN-Message buffer of the JTAG master 210.

Disadvantageously, this implementation of debug connection to system-on-chip 200 does not support debug-under-reset or true debug use-case (i.e., independent from functional infrastructure) due to using system IPs (i.e., DMA 206, CAN IP 202, NoC 208, and host CPU 204). Further, the overall effective data transaction rate is low due to the overheads from the intercommunications between the various components. System-on-chip 200 requires a customized IP (e.g., JTAG master 210) and multiple modifications to the JTAG controller 213, the CAN IP 202, and the overall system-on-chip system architecture. Moreover, significant software solutions are required to initialize DMA 206, JTAG master 210, and the CAN IP 202.

Figure 3:
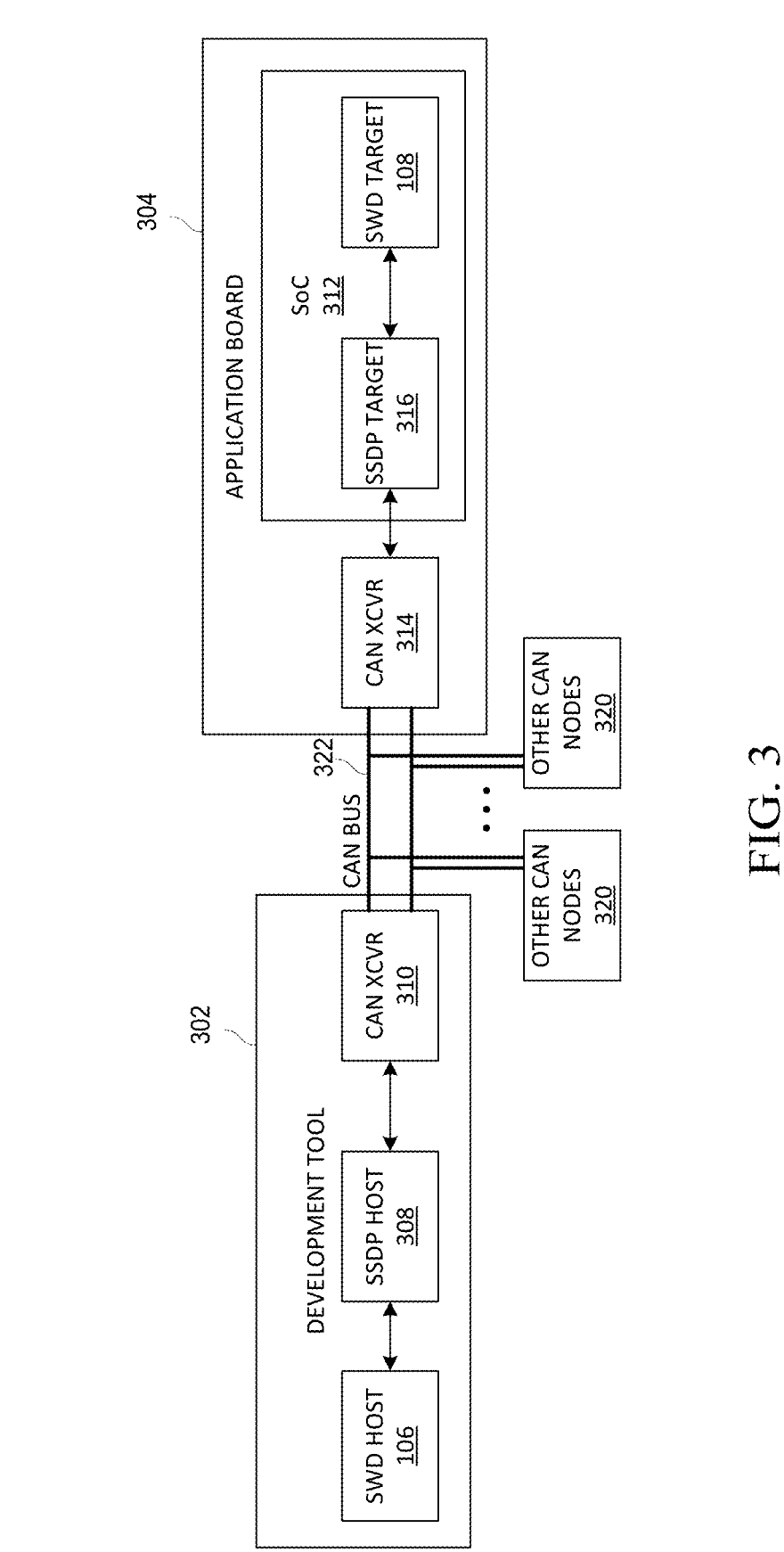
FIG. 3 is a block diagram of an embodiment system for debugging a system-on-chip using a single signal debug port (SSDP) protocol.

FIG. 3 illustrates a block diagram of an embodiment system 300 for debugging a system-on-chip 312 using a single signal debug port (SSDP) protocol. System 300 includes a development tool 302 for debugging the system-on-chip 312 of the application board 304, which may (or may not) be arranged as shown. System 300 may include other components not shown.

Development tool 302 includes the SWD host 106, an SSDP host 308, and a CAN transceiver 310. SSDP host 308 is coupled between the SWD host 106 and the CAN transceiver 310. Application board 304 includes the system-on-chip 312 and the CAN transceiver 314. System-on-chip 312 includes an SSDP target 316 and the SWD target 108. SSDP target 316 is coupled between the CAN transceiver 314 and the SWD target 108.

CAN transceiver 310 of the development tool 302 is coupled to the CAN transceiver 314 of the application board (coupled to the system-on-chip 312) and other CAN nodes 320 through a CAN Bus 322. The CAN transceiver 314 uses existing CAN Bus Pins of the application board 304 to receive communications from the CAN transceiver 310.

Embodiments of this disclosure introduce an SSDP protocol as a signal conversion bridge (i.e., SSDP bridge) between the SWD host 106 and the SWD target 108 used for, for example, debugging purposes. The signal conversion bridge converts the two-wire SWD protocol such that the SWD communication between SWD host 106 and SWD target 108 is supported over the single signal asynchronous CAN Bus 322 without using the CAN protocol but using CAN Bus characteristics, as explained in further detail hereinbelow.

Using the SSDP protocol, the signals from the SWD host 106 and the SWD target 108 are converted into pulse width modulation (PWM) encoded data and superimposed over the SWD clock signal. This allows transmitting the clock signal and the PWM-encoded data using a single signal over a single wire of CAN-Bus (i.e., differential pair of wires). The SSDP protocol includes activation, response, acknowledge, and reset sequences. The successful completion of the activation, response, and acknowledge sequences establishes the SSDP link between the development tool 302 and the application board 304.

The SSDP protocol allows communication between the SWD host 106 of the debugger and the SWD target 108 of the device under test (DUT). The debug system 300 (SSDP-based debugger) can support all possible features available to system 100. In contrast to system 100, which uses an SWD bus and dedicated I/O pins, system 300 uses an existing CAN Bus (i.e., differential pair of wires), CAN transceivers 310 and 314, and CAN Receive/Transmit Pins. Further, system 300 uses the Wired-AND and the CAN electrical characteristics to transmit communications across the CAN Bus instead of using the CAN functional protocol (i.e., CAN message frames) and a CAN protocol controller. Generally, the CAN protocol uses carrier sense multiple access and collision resolution (CSMA-CR) to arbitrate CAN messages over the CAN Bus 322. CSMA-CR is achieved using dominant and recessive states on the CAN-Bus derived from Wired-AND properties of the CAN-Bus electrical characteristics. It states that when the dominant value (i.e., logic low) is transmitted over the CAN-Bus, it holds the bus to a logic low and suppresses the logic high values transmitted by other transmitters.

In various embodiments, the SWD target 108 signals are coupled to the SSDP target 316 instead of the conventional approach in system 100, where SWD target 108 signals are coupled to the pads of silicon-on-chip 104. In these embodiments, the SSDP target 316 shares pads with existing and available CAN instances of silicon-on-chip 312.

In embodiments, the SSDP host 308 forces (i.e., sets) all the CAN nodes 320 to Bus-Off state by continuously disturbing the ongoing CAN communication. In embodiments, each CAN node 320 is set to the Bus-Off state after receiving a sufficient number of erroneous CAN frames. In the Bus-Off state, the CAN node(s) 320 is no longer an active participant in the CAN communication over the CAN Bus 322. Once system 300 is configured in this initial setting, the SSDP host 308 transmits a unique activation sequence to SSDP target 316. Upon receiving the unique activation sequence, the SSDP target 316 begins sending a response to SSDP host 308. The SSDP host 308, after receiving an OK response in the activation sequence from the SSDP target 316 and transmitting an acknowledge of response, begins transferring debug data to the SSDP target 316—further detailed below.

Figure 4:
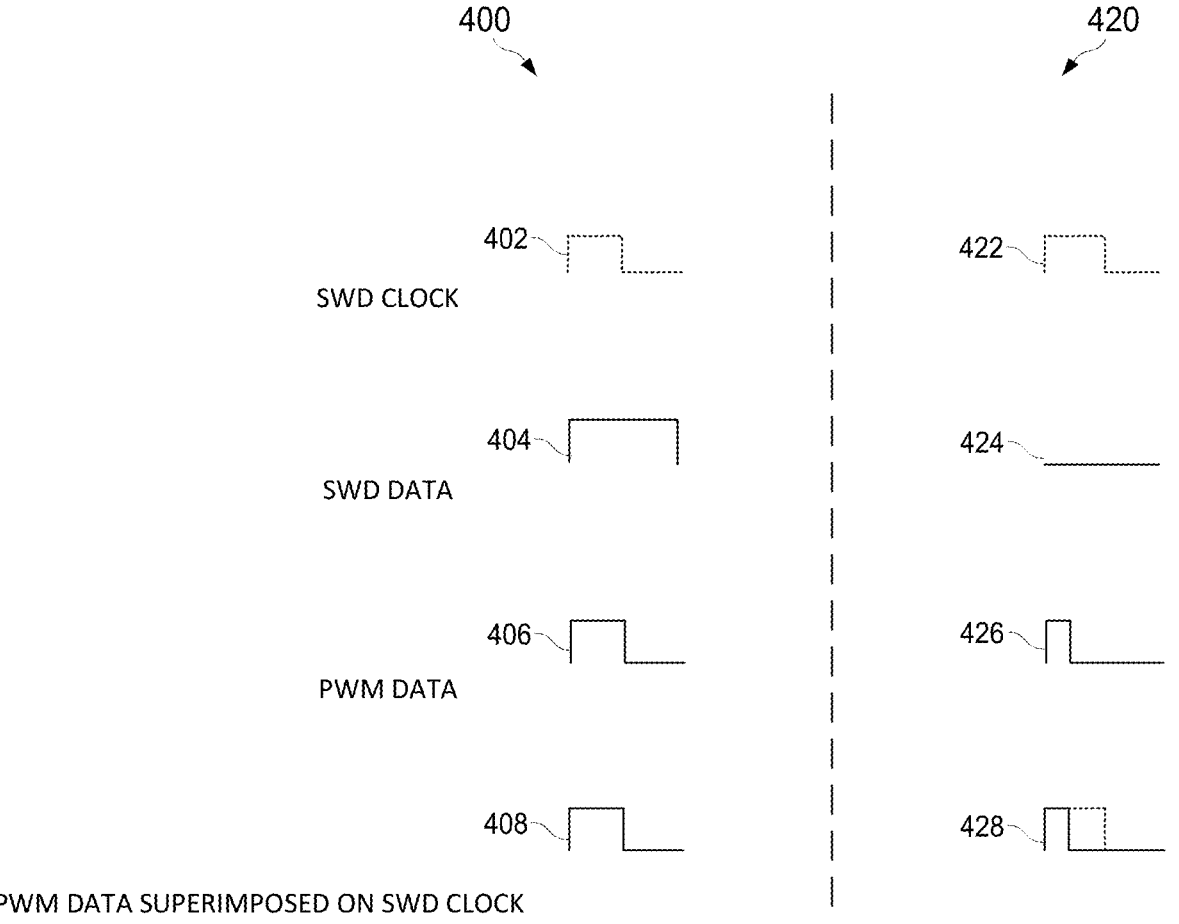
FIG. 4 is an embodiment of various waveforms.

FIG. 4 illustrates embodiment waveforms 400 of the SWD clock signal 402, SWD clock signal 422, SWD logic high data signal (SWD-1) 404, SWD logic low data signal (SWD-0) 424, PWM logic high data signal (PWM-1) 406, PWM logic low data signal (PWM-0) 426, PWM logic high data signal superimposed on SWD clock signal 408, and PWM logic low data signal superimposed on SWD clock signal 428. It is noted that SWD clock signals 402 and 422 represent the same clock signal.

PWM logic high data signal superimposed on SWD clock signal 408 and PWM logic low data signal superimposed on SWD clock signal 428 illustrates the phase relationship between the PWM data signals (i.e., PWM logic high data signal (PWM-1) 406, PWM logic low data signal (PWM-0) 426) and the SWD clock signals (i.e., SWD clock signal 402 and SWD clock signal 422).

The first set of waveforms 400 illustrates an example of a superimposed PWM logic high data signal over the SWD clock signal transmitted over the CAN Bus 322. The second set of waveforms 420 illustrates an example of a superimposed PWM logic low data signal over the SWD clock signal transmitted over the CAN Bus 322. In these examples, the SWD clock signals 402 and 422 are conveyed from the SWD host 106 to the SWD target 108 (or vice versa) through the superimposed signals 408 and 428.

In embodiments, to transmit the PWM logic high data signal (PWM-1) 406 over the CAN Bus 322, a pulse-width modulation of fifty percent (50%) of the SWD clock period of the SWD clock signal 402 is used. In embodiments, to transmit the PWM logic low data signal (PWM-0) 426 over the CAN Bus 322, a pulse-width modulation of twenty-five percent (25%) of the SWD clock period of the SWD clock signal 422 is used. In embodiments, the duty cycle percentage to distinguish between PWM logic high data signal (PWM-1) 406 and PWM logic low data signal (PWM-0) 426 are not fixed and can vary based on system parameters, which are using SSDP protocol.

In embodiments, the SSDP protocol uses the Wire-AND property of the CAN Bus 322 to determine low and high logic values of PWM logic high data signal superimposed on SWD clock signal 408 and PWM logic low data signal superimposed on SWD clock signal 428.

In response to the development tool 302 generating an SWD transaction from the SWD host 106 to the SWD target 108, the SSDP host 308 modulates the SWD logic high data signal (SWD-1) 404 or the SWD logic low data signal (SWD-0) 424 to generate the PWM logic high data signal (PWM-1) 406 and PWM logic low data signal (PWM-0) 426, respectively.

In contrast, when the SWD transaction is from the SWD target 108 to the SWD host 106, SSDP target 316 is configured for PWM encoding, and SSDP host 308 decodes the PWM logic high data signal (PWM-1) 406 and PWM logic low data signal (PWM-0) 426 to generate the SWD logic high data signal (SWD-1) 404 and SWD logic low data signal (SWD-0) 424, respectively to send the decoded data further to SWD Host 106.

As the SWD protocol is a source synchronous protocol, SWD target 108 works on the SWD clock signals (i.e., SWD clock signal 402 and SWD clock signal 422) provided by the SWD host 106. The SWD clock period (i.e., clock period of SWD clock signal 402 and SWD clock signal 422) remains intact after inserting (i.e., superimposing) the PWM data signals (i.e., PWM logic high data signal (PWM-1) 406, PWM logic low data signal (PWM-0) 426) by the SSDP host 308 or the SSDP target 316.

In embodiments, the pulse width modulation and demodulation are completed within a single SWD clock cycle by the SSDP host 308 and SSDP target 316. In embodiments, a high-frequency clock signal is used by, for example, an internal clock (e.g., 40 MHz) by the SSDP host 308 or the SSDP target 316 (or both) for modulation, demodulation, and remaining functional logic blocks.

Thus, the SSDP protocol allows the original functionality of the SWD protocol, as illustrated in system 100, to remain intact, which results in the SSDP protocol working transparently with the SWD host 106 and the SWD target 108.

Figure 5:
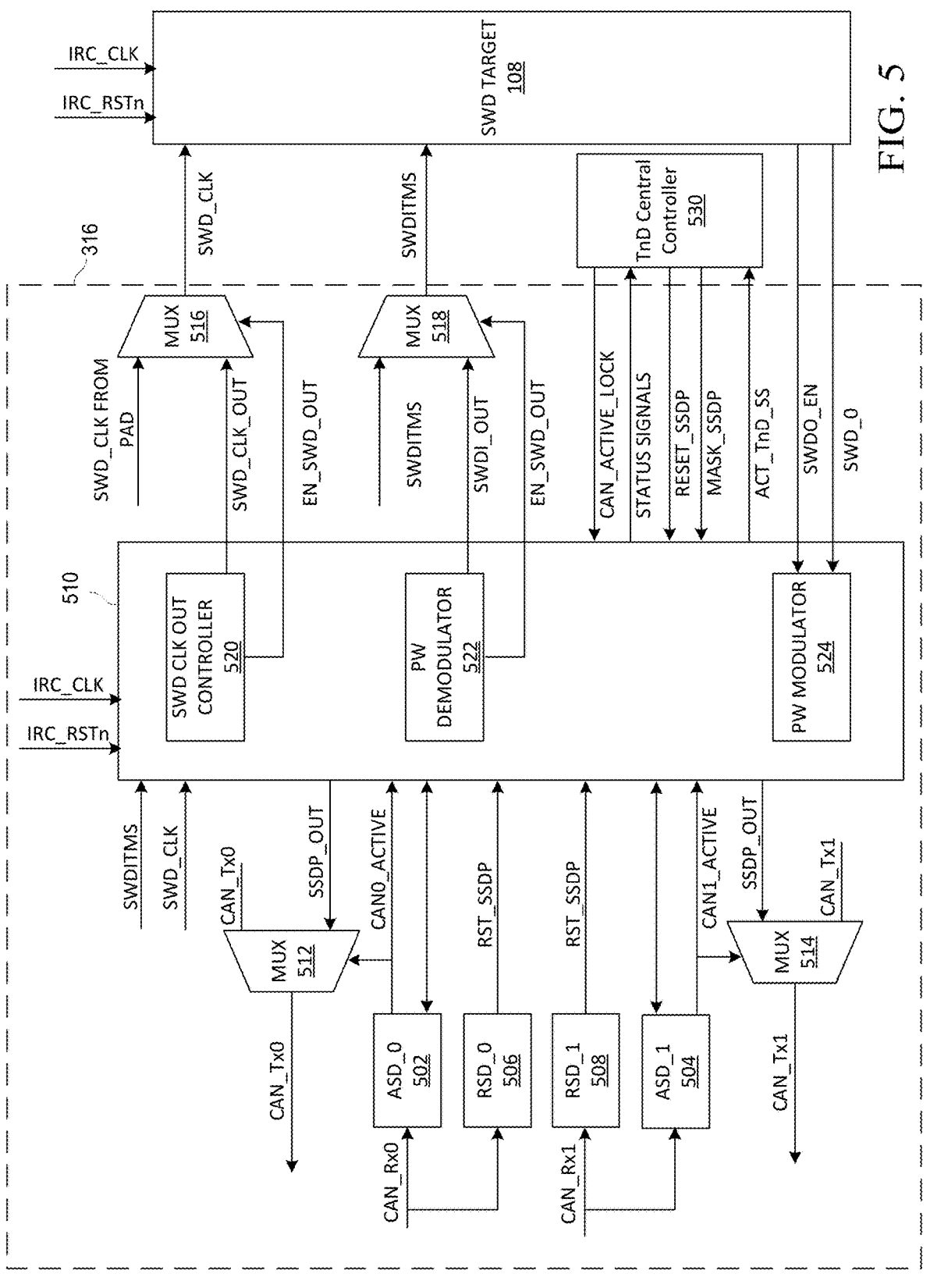
FIG. 5 is a block diagram of an embodiment SSDP target coupled to the SWD target and Central controller of Trace and Debug Subsystem (TnD_SS)

FIG. 5 illustrates a block diagram of an embodiment SSDP target 316 coupled to the SWD target 108 and Central controller of Trace and Debug Subsystem (TnD_SS) 530. SSDP target 316 includes a first activation sequence detector circuit (ASD0) 502, a second activation sequence detector circuit (ASD1) 504, a first reset sequence circuit (RSD0) 506, a second reset sequence circuit (RSD1) 508, a pulse width modulator/demodulator circuit 510, a first multiplexer 512, a second multiplexer 514, a third multiplexer 516, and a fourth multiplexer 518, which may (or may not) be arranged as shown. In addition, SSDP target 316 may include additional components not shown.

Pulse width modulator/demodulator circuit 510 includes an SWD clock out controller 520, a pulse width demodulator circuit 522, and a pulse width modulator circuit 524, which may (or may not) be arranged as shown. In addition, the pulse width modulator/demodulator circuit 510 may include additional components not shown.

The first activation sequence detector circuit (ASD0) 502, the second activation sequence detector circuit (ASD1) 504, the first reset sequence circuit (RSD0) 506, the second reset sequence circuit (RSD1) 508, the first multiplexer 512, and the second multiplexer are coupled to the CAN IO pins (CAN_Rx and CAN_Tx) of the application board 304— used to couple to off-chip (or on-chip) CAN transceiver 314. The third multiplexer 516, the fourth multiplexer 518, and the pulse width modulator circuit 524 are coupled to the SWD target 108. The pulse width modulator/demodulator circuit 510 is coupled to the Trace and Debug Subsystem (TnD_SS) 530—the TnD Central Controller and Reset Control.

Although SSDP target 316 is shown to have a pair of activation sequence detector circuits and reset sequence circuits, it should be noted that the number of these circuits is non-limiting, and fewer or greater are also contemplated. Further, to simplify the discussion, the details herein below are described for the first activation sequence detector circuit (ASD0) 502 and the first reset sequence circuit (RSD0) 506. Thus, it should be understood that the second activation sequence detector circuit (ASD1) 504 and the second reset sequence circuit (RSD1) 508, respectively, follow the same functions as described for the first activation sequence detector circuit (ASD0) 502 and the first reset sequence circuit (RSD0) 506.

SSDP target 316 is configured to have three main functions: (i) perform the SSDP activation sequence by the first activation sequence detector circuit (ASD0) 502 and the second activation sequence detector circuit (ASD1) 504, (ii) create SWD clock (by the SWD clock out controller 520) and clock selected signal (EN_SWD_OUT) from logic high PWM data signals (PWM-1) and PWM logic low data signal (PWM-0) 426 sequences received from SSDP host 308, and (iii) demodulate signals received from SSDP host 308 by the pulse width demodulator circuit 522 and modulate signals transmitted by SSDP target 316 by the pulse width modulator circuit 524.

The SSDP protocol is mapped onto the same pins used for CAN communication in a typical application. The SSDP activation sequence is unique in that it is not replicated during a normal CAN communication-unique for the entire spectrum of possibilities covering classic CAN, CAN-FD protocols, various bitrates, IDs, and payloads. The uniqueness of the SSDP activation sequence prevents inadvertent detection of the activation sequence as part of normal CAN communication. Further, as the debugging over the CAN physical layer does not use the CAN protocol, simultaneous CAN communication during the debugging over the same CAN Bus 322 is avoided to prevent interferences. It is noted that even though the activation sequence (or by generating multiple errors in CAN message frames) causes the CAN nodes to be placed in a Bus-off state, this consideration prevents any undesired or unnoticed flaws.

The SSDP activation sequence is seen as a series of invalid CAN frames such that the CAN nodes 320 are switched into error-passive and then into Bus-Off mode. Once the CAN nodes 320 are switched into Bus-Off mode, the debugging tool (i.e., development tool 302 can exclusively communicate over the CAN physical layer without interferences from the CAN protocol communications. It is noted that during the SSDP activation sequence, the cycle time is measured to adapt to the bitrate and properly set the sample point and PWM duty cycle of the PWM data signals.

The SSDP activation sequence includes a detection, a response, and an acknowledgment of response sub-sequences. The detection sequence includes a process of detecting a set number of logic high PWM data signals (PWM-1) from the development tool 302 by the activation sequence detector circuits (i.e., the first activation sequence detector circuit (ASD0) 502 and the second activation sequence detector circuit (ASD1) 504). In embodiments, the development tool 302 transmits a minimum of 1024 PWM logic high data signal (PWM-1) 406 symbols to initiate the activation sequence.

During the detection sequence, the activation sequence detector circuits detect the set number (e.g., 1024) PWM logic high data signal (PWM-1) 406 symbols. Table I illustrates a non-limiting example of an SSDP frequency table used by the activation sequence detector circuits to determine the SWD clock frequency by sampling the time period between the rising edges of the PWM data signals using an internal clock set to 40 MHz. The SWD clock frequency is not limited to the values shown in the table below.

TABLE I

| SWD Clock Frequency (KHz) | 40 MHz Clock Count in the period of one SWD clock cycle | Counter Value to Decide the SWD Frequency (+/−6.25%) | |
| --- | --- | --- | --- |
| | | MIN | MAX |
| 2000 | 20 | 19 | 21 |
| 1000 | 40 | 38 | 42 |
| 700 | 57 | 54 | 60 |
| 500 | 80 | 75 | 85 |
| 400 | 100 | 94 | 106 |
| 200 | 200 | 188 | 212 |
| 100 | 400 | 375 | 425 |

In embodiments, the internal clock (here, set to 40 MHz) is used to sample the time between two consecutive rising to rising and rising to falling edges of the PWM logic high data signal (PWM-1) 406 symbols. Both sampled times are compared with previously measured times for the immediately preceding PWM logic high data signal (PWM-1) 406 symbol. In response to the consecutive time measurements being within a non-limiting 6.25% range of each other, the current cycle is considered a valid cycle of an activation sequence. It is noted that although Table I shows counter values only or rising to rising edge periods with margins, a similar table can be drawn for rising to falling edge time periods with margins.

The SSDP target 316 is configured to continuously compare the consecutive time measurements and increase the PWM symbol counter upon detecting the same clock period and duty cycle for the set number (e.g., 1024) of PWM logic high data signal (PWM-1) 406 symbols. The PWM symbol counter allows the activation sequence detector circuits to detect the transmission of the set number (e.g., 1024) PWM logic high data signal (PWM-1) 406 symbols (without any gaps (i.e., no PWM-o symbols)) by the development tool 302 used to initiate the activation sequence.

In response to the consecutive time measurements being outside the non-limiting 6.25% range of each other, the current cycle is considered an invalid cycle of the activation sequence, and the activation sequence detector circuits detect a detection sequence failure. As a result of detecting the detection sequence failure, the PWM symbol counter is reset to "o". Beginning from the next cycle, the SSDP target 316 restarts the process of detecting the 1024 PWM logic high data signal (PWM-1) 406 symbols in search of the activation sequence being transmitted by the development tool 302.

In embodiments, the SSDP target 316 is configured to reset upon receiving a maximum number of PWM logic high data signal (PWM-1) 406 symbols. For example, if the maximum number of PWM logic high data signal (PWM-1) 406 symbols for reset is set to 3071, the SSDP target 316 is configured to reset upon receiving 3072 consecutive PWM logic high data signal (PWM-1) 406 symbols.

In embodiments, the SSDP host 308 is configured to go into a dormant state (i.e., when reset sequence is not intended) in response to SSDP host 308 not receiving a response from the SSDP target 316 (e.g., due to a fault or absence of the SSDP target 316) after transmitting the maximum number of PWM logic high data signal (PWM-1) 406 symbols. In embodiments, the SSDP host 308 is configured to go into the dormant state after attempting to initiate the activation sequence and not receiving a response from SSDP target 316.

In response to successfully detecting an activation sequence by the SSDP target 316, the response sequence is initiated by the SSDP target 316. In embodiments, the SSDP host 308 continues to transmit the PWM logic high data signal (PWM-1) 406 symbols to initiate the activation sequence until it receives the end of response sequence transmission from the SSDP target 316.

In embodiments, the response sequence has a pattern: "0000_1111_0000_1111_0000_11_FreqPeriodValue". The response sequence has a first nibble of PWM logic low data signal (PWM-0) 426 (i.e., "0000"). The PWM logic low data signal (PWM-0) 426 is driven by SSDP target 316 to indicate to the SSDP host 308 the start of the response sequence. The SSDP host 308 is configured to, during the initiation of the activation sequence, continuously transmit the PWM logic high data signal (PWM-1) 406 symbols on the CAN Bus 322 and receive/read the current value on the CAN Bus 322. Due to the Wire-AND property of the CAN Bus 322, PWM logic low data signal (PWM-0) 426 is the resultant value on the CAN Bus 322.

The SSDP host 308, in response to detecting the first nibble of PWM logic low data signal (PWM-0) 426 (i.e., "0000"), begins the response sequence detection sequence.

Optionally, the response sequence has a set variation (non-limiting) of PWM logic high data signal (PWM-1) 406 symbols and PWM logic low data signal (PWM-0) 426 symbols (i.e., 1111_0000_1111_0000_11) to provide a robust response sequence. The SSDP host is configured to decode the response sequence using a decode logic circuit to check the set variation and align itself to the response sequence.

After transmitting the defined sequence of "o's" and "1's", the SSDP target 316 transmits the frequency period value stored from the last cycle (e.g., $1024^{th}$ cycle) of the activation sequence to the SSDP host 308. In embodiments, the frequency period value is stored in a memory (e.g., flip=flops) of the system-on-chip 312. In embodiments, the bit-size of the frequency period value is 10 bits. In embodiments, the most significant bit (MSB) of the frequency period is transmitted first. Thus, in embodiments, the size of the response sequence is 32 bits.

The SSDP host 308, upon receiving the response sequence, decodes the PWM symbols and compares the frequency period value from the response sequence to the period of the SWD clock signal 402. Considering the jitter of the clock and variations across the CAN Bus 322, the difference in periods is somewhat flexible. In embodiments, the minimum and maximum variation between the two periods is 6.25%. The frequency period is frozen after the completion of the detection sequence.

Table II illustrates a non-limiting example of counter values for driving and detecting the PWM logic low data signal (PWM-0) 426 by the SSDP target 316 and SSDP host 308.

TABLE II

| 40 MHz Clock Count in | | | Counter Values for Driving and Detecting PWM-0 (sample clock at 40 MHz) | | |
| --- | --- | --- | --- | --- | --- |
| SWD Clock Frequency (KHz) | a period of one SWD clock cycle | 50% of 40 MHz clock count value | Drive PWM-0 25% | Release PWM-0 75% | Detect PWM-0 37.5% |
| 2000 | 20 | 10 | 5 | 15 | 7 |
| 1000 | 40 | 20 | 10 | 30 | 15 |
| 700 | 57 | 29 | 14 | 42 | 21 |
| 500 | 80 | 40 | 20 | 60 | 30 |
| 400 | 100 | 50 | 25 | 75 | 37 |
| 200 | 200 | 100 | 50 | 150 | 75 |
| 100 | 400 | 200 | 100 | 300 | 150 |

As described herein in FIG. 4, a 25% value of the frequency period count is used to drive the PWM logic low data signal (PWM-0) 426. A 75% value of the frequency period count is used to release the drive of PWM logic low data signal (PWM-0) 426 and start the drive of PWM logic high data signal (PWM-1) 406 on the CAN Bus 322 transmit line (only for the SSDP target 316). It is noted that the second half of the PWM period is always driven to "o" by the SSDP host 308. Thus, the CAN Bus 322 is always logic low in the second half of the PWM period.

The exactness of the 25% and the 75% is not necessary, and other fractions are similarly contemplated for the counter values used to drive and detect PWM-o, as illustrated in the table above. In addition, the table shows a 37.5% value of the frequency period count for detecting the PWM logic low data signal (PWM-0) 426 on the CAN Bus 322.

After the SSDP host 308 receives the response sequence from the SSDP target 316 and determines that the frequency period value of the response sequence is within a satisfactory range, the SSDP host 308 sends an acknowledge of response sequence to the SSDP target 316.

In embodiments, the acknowledge of response sequence has a pattern: "0000_1111_0000_1111_0000_11_FreqPeriodValue_------_1111_1111", where the "-----" portion is considered optional. Thus, the acknowledge of response sequence is equal to the response sequence followed by 8 symbols of the PWM logic high data signal (PWM-1) 406. The optional portion "-----" represents a duration during which no PWM symbol is transmitted over the CAN Bus 322 by the development tool 302. This provision allows the development tool 302 to include a delay to, for example, compare the frequency period values in the software. As the SSDP target 316 works on the rising edge of the PWM symbol, the SSDP target 316 waits until the next symbol has arrived. As a constraint, the optional portion period is not long enough to return connected CAN-nodes out of the Bus-off state.

The successful completion of the acknowledge of response sequence is conditioned such that at any time during an 8-symbol period of the PWM logic high data signal (PWM-1) 406, the SSDP host 308 can send a PWM logic low data signal (PWM-0) 426 to abort the acknowledge of response sequence. For example, if the SSDP host 308 determines that the frequency period value from the response sequence is outside the range of the frequency period value of the SWD clock signal 402, the SSDP host 308 drives one or more bits of the expected 8-symbol period of the PWM logic high data signal (PWM-1) 406 to a PWM logic low data signal (PWM-0) 426.

The SSDP target 316 considers the acknowledge of response sequence as a success in response to not detecting a PWM logic low data signal (PWM-0) 426 during the expected 8-symbol period of the PWM logic high data signal (PWM-1) 406. The SSDP target 316, however, considers the acknowledge of response sequence as a failure in response to detecting at least one PWM logic low data signal (PWM-0) 426 during the expected 8-symbol period of the PWM logic high data signal (PWM-1) 406. In response to detecting a failed acknowledge of response sequence, the SSDP target 316 returns to the initial state of the activation sequence and restarts the detection sequence for the next possible activation sequence from the development tool 302 over the CAN Bus 322.

In embodiments, after successfully completing the acknowledge of response sequence, the SSDP host 308 transmits additional (e.g., four) PWM logic high data signal (PWM-1) 406 symbols to the SSDP target 316. The transmission is then followed by additional (e.g., four) PWM logic low data signal (PWM-0) 426 symbols, such as in: "1111_0000" or "1111_1111_1111_0000". The transition from the PWM logic high data signal (PWM-1) 406 symbols to the PWM logic low data signal (PWM-0) 426 symbols indicates to the SSDP target 316 to enable (i.e., switch ON) the SWD clock of the SWD target 108 and begin the process to provide the SWD data to the SWD target 108 (i.e., enable data line between the SWD target 108 and the SSDP target 316). Further, this provision allows fulfilling the condition that the data value on an SWD data line must be logic low "o" before sending a first start bit of the SWD packet. Moreover, the provision indicates to the SSDP target 316 to set a signal to remove the Trace and Debug Subsystem reset.

In embodiments, SSDP target 316 is configured to determine whether the SSDP host 308 has communicated a reset sequence to the SSDP target 316 using the first reset sequence circuit (RSD0) 506 and the second reset sequence circuit (RSD1) 508. In response to detecting the reset sequence by the first reset sequence circuit (RSD0) 506 or the second reset sequence circuit (RSD1) 508, the SSDP target 316 is reset. In embodiments, in case of an unexpected error, in the test setup, the SSDP target 316 may transition into an unknown state. In this unknown state, the SSDP target 316 cannot detect a correct pattern. A unique reset sequence is, thus, created in the SSDP protocol to be detected by the SSDP target 316 (at any time) without depending on the current or previous state of communication. For example, the SSDP target 316 enters into reset in response to receiving a large number (e.g., 3072 or more) of continuous PWM logic high data signal (PWM-1) 406 symbols.

After the SSDP host 308 transmits the additional (e.g., four) PWM logic high data signal (PWM-1) 406 symbols to the SSDP target 316, the SSDP link between the SSDP host 308 and the SSDP target 316 over the CAN Bus 322 is fully established. Once the SSDP link has been established, the SWD host 106 can begin the transmission of conventional SWD transactions. In embodiments, the SWD host 106 generates the SWD packets, which are to be encoded by the SSDP host 308, before the encoded packets are transmitted over the CAN Bus 322. The SSDP target 316 receives and decodes the PWM symbols and sets the SWD target 108 and the data lines. In embodiments, this operation is completed within a single SWD clock cycle.

The output of the pulse width modulator circuit 524 is coupled to the first multiplexer 512 and the second multiplexer 514. Once the pulse width modulator circuit 524 generates the PWM signal based on the SSDP protocol, the PWM signal is transmitted to the first multiplexer 512 and the second multiplexer 514.

Each of the activation sequence detector circuits (i.e., the first activation sequence detector circuit (ASD0) 502 and the second activation sequence detector circuit (ASD1) 504) are configured to generate a respective control signal (CANx-_Active). Each control signal is coupled to a select line of a corresponding multiplexer. For example, the control signal (CAN0_Active) from the first activation sequence detector circuit (ASD0) 502 is coupled to the select line of the first multiplexer 512. As another example, the control signal (CAN1_Active) from the second activation sequence detector circuit (ASD1) 504 is coupled to the select line of the second multiplexer 514. The first multiplexer 512 and the second multiplexer 514 are configured to select between the regular CAN communication (CAN_Tx) from the CAN controller or the SSDP communication to be transmitted over the associated CAN Bus 322 coupled to the output of the multiplexers in accordance with the control signal (CANx_Active) from the activation sequence detector circuits.

In embodiments, to prevent an unexpected stoppage in the CAN communication from, for example, spurious activation of the control signal (CANx_Active), safety measures can be implemented to detect the setting of the CAN I/O pins for SSDP use. For example, the control signal (CANx_Active) can be connected to the Fault Collection and Control Unit (FCCU) of the system-on-chip 312. The FCCU can detect and report a spurious or unintended activation of the SSDP in the application board 304. Further, in response to SSDP being enabled by the debugger (i.e., upon successful activation sequence), the FCCU can be configured to determine that the SSDP being enabled is not spurious or unintended. In embodiments, the FCCU is configured to read the SSDP Status Register in the Central Controller IP of the Trace and Debug SubSystem (TnD_SS). In the event of a spurious or unintended activation of the SSDP at the multiplexers, the FCCU can set the SSDP_MASK bit in the SSDP Control Register.

In embodiments, the last register of the control signal (CANx_Active), SSDP_LOCKED, and SSDP_MASK logic is implemented using Triple Voted FlipFlops (TVF).

A successful SWD transaction contains three phases: (i) the packet request phase, (ii) the acknowledge response phase, and (iii) the data transfer phase.

Figure 6:
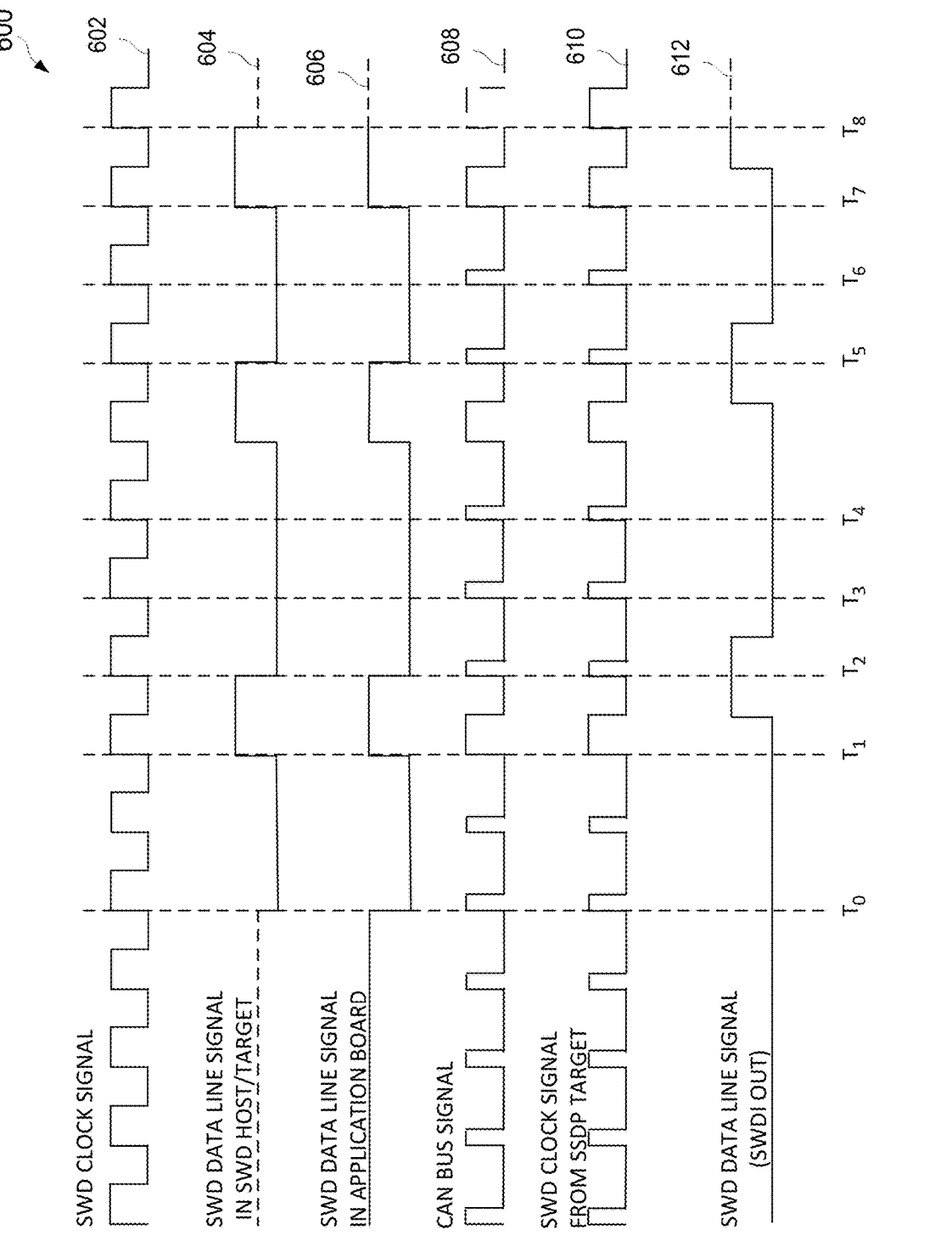
FIG. 6 is a timing diagram, an example of a PWM decoding of the SWD packet request phase.

FIG. 6 illustrates timing diagram 600, an example of a PWM decoding of the SWD packet request phase. The timing diagram 600 includes a timing diagram for the SWD Clock signal 602, the SWD Data Line signal 604, the SWD Data Line signal 606, the CAN Bus signal 608, the SWD Clock signal (SWD_CLK_OUT) 610, and the SWD Data Line signal (SWDI_Out) 612.

The SWD Clock signal 602 is the clock signal of the SWD host 106 and is used as a reference signal. The SWD Data Line signal 604 is the data signal to be driven by SWD host 106 to SWD target 108. The SWD Data Line signal 606 is the data propagating on the data line of the application board 304. The SWD Data Line signal 604 and SWD Data Line signal 606 are based on the SWD protocol.

The SWD Data Line signal 604 illustrates a packet request phase from either the SWD host 106 or the SWD target 108. A packet request phase consists of 8 bits. Before time $T_0$, the SWD host 106 and the SWD target 108 are not driving a value on the SWD data line (illustrated as a dashed line for the SWD Data Line signal 604). Between time $T_0$ and time $T_1$, the SWD Data Line signal 604 includes a minimum of two idle cycles (logic low periods) to abide by the SWD protocol specifications.

From time $T_1$ to time $T_2$, the SWD Data Line signal 604 includes a single start bit (Start), with the value of "1". From time $T_2$ to time $T_3$, the SWD Data Line signal 604 includes a single bit (APnDP) indicating whether the Debug Port or the Access Port Access Register is to be accessed-a value of "1" is used for accessing the Access Port. From time $T_3$ to time $T_4$, the SWD Data Line signal 604 includes a single bit (RnW) for write or read access-a value of "1" is used to indicate read access and a value of "o" is used to indicate write access. From time $T_4$ to time $T_5$, the SWD Data Line signal 604 includes two bits (A [2:3]) indicating the address field of the Debug Port or the Access Port Access Register. From time $T_5$ to time $T_0$, the SWD Data Line signal 604 includes a single odd parity bit (Parity) based on the APnDP, RnW, and A [2:3] bits. From time $T_0$ to time $T_7$, the SWD Data Line signal 604 includes a single stop bit (Stop)-in a synchronous SWD protocol the value for the stop bit is always a "o". From time $T_0$ to time $T_7$, the SWD Data Line signal 604 includes a single bit (Park) with a value of "1". From time $T_7$ to time $T_8$, the SWD Data Line signal 604 includes the turnaround period (Trn) between the packet request and acknowledge response phases.

The SWD Data Line signal 606 on the data line of the application board 304 follows the SWD Data Line signal 604 from time $T_1$ to time $T_7$. A strong pull-up on the application board 304 is used to pull the data line, on which the SWD Data Line signal 606 propagates, to the supply voltage (e.g., Vdd) when not being driven by either the SWD host 106 or the SWD target 108 (i.e., before time $T_0$).

The CAN Bus signal 608 is the PWM encoded signal of the SWD Data Line signal 604 propagating on the CAN Bus 322 based on the SSDP protocol. Before time $T_0$, the CAN Bus signal 608 is driven as PWM logic low data signal (PWM-0) 426, indicating that the SWD line is idle before the start bit (Start). The SWD host 106 is configured to enable the SWD Clock signal 602 only when the SWD data is communicated (i.e., gated clock).

The SWD Clock signal (SWD_CLK_OUT) 610 is the SWD clock signal from the SSDP target 316 to the SWD target 108 from the decoded CAN Bus signal 608. As the PWM encoded signal is superimposed over the SWD Clock signal 602, there is no phase difference between the SWD Clock signal (SWD_CLK_OUT) 610 and the rising edge of the CAN Bus signal 608. Thus, the SWD clock from the pad of the application board 304 is the same as the SWD Clock signal (SWD_CLK_OUT) 610 from the SSDP target 316. The SWD Clock Out Controller 520 of the pulse width modulator/demodulator circuit 510 decodes the CAN Bus signal 608 and provides the SWD Clock signal (SWD_CLK-_OUT) 610 to an input of the third multiplexer 516. Further, the SWD Clock Out Controller 520 generates the select signal (EN_SWD_OUT) to the select line of the third multiplexer 516 to switch the output of the multiplexer (mapped to the SWD target 108) between the SWD Clock signal (SWD_CLK_OUT) 610 and the SWD Clock from the pad of the application board 304. The SWD Clock Out Controller 520 checks for the time to map the decoded CAN Bus signal 608 to the SWD Clock signal (SWD_CLK_OUT) 610.

The SWD Data Line signal (SWDI_Out) 612 is the decoded data signal from the SSDP target 316 to the SWD target 108 from the decoded CAN Bus signal 608. The pulse width demodulator circuit 522 is configured to decode the CAN Bus signal 608 by counting the value "Detect PWM-o" from, for example, table II hereinabove.

In response to detecting the correct PWM value on the CAN Bus 322 (i.e., CAN Rx0 line or CAN Rx 1 line), the pulse width demodulator circuit 522 drives the SWD Data Line signal (SWDI_Out) 612 for the detected value. The detection process takes a few cycles of the 40 MHz clock of the SSDP target 316, which delays the sending of the detected value to the SWD target 108 from the SSDP target 316. The SWD Data Line signal (SWDI_Out) 612 is a delayed signal equal to the SWD Data Line signal 604. SWD target 108 is configured to sample the correct value as the SWD protocol is a rising edge to rising edge protocol with a maximum supported frequency of the SWD clock being 2 MHz (also targeted to work on the 4 MHz SWD clock). In embodiments, the SWD Data Line signal (SWDI_Out) 612 has a delay with a phase shift of about 40%, which can vary based on the SWD clock frequency.

The pulse width demodulator circuit 522 provides the SWD Data Line signal (SWDI_Out) 612 to an input of the fourth multiplexer 518. Further, the pulse width demodulator circuit 522 generates the select signal (EN_SWD_OUT) to the select line of the fourth multiplexer 518 to switch the output of the multiplexer (mapped to the SWD target 108) between the SWD Data Line signal (SWDI_Out) 612 and the serial wire data input and TAP test mode select (SWDITMS).

Figure 7:
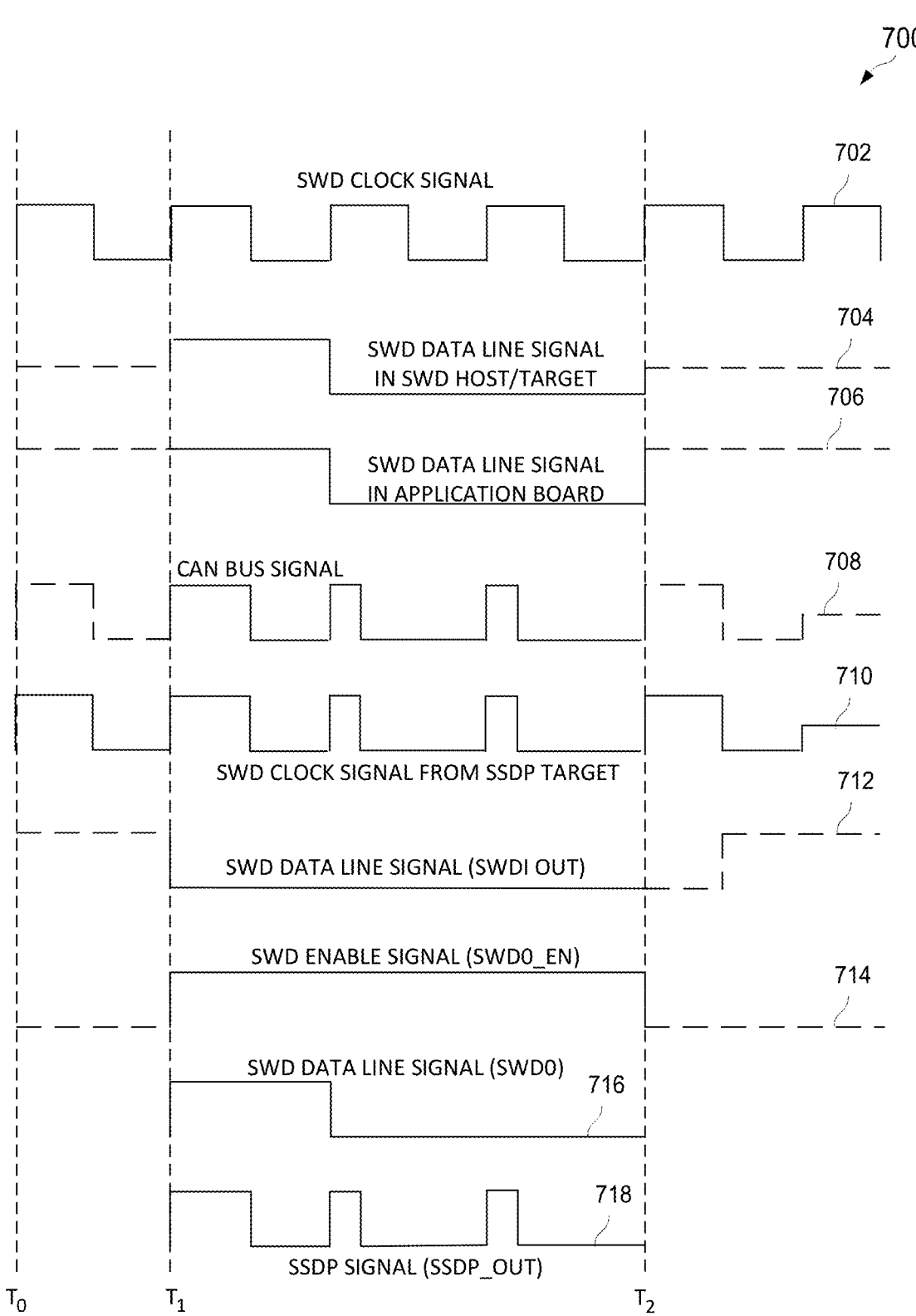
FIG. 7 is a timing diagram, an example of a PWM encoding of the SWD acknowledge response phase.

FIG. 7 illustrates timing diagram 800, an example of a PWM encoding of the SWD acknowledge response phase. The timing diagram 700 includes a timing diagram for the SWD Clock signal 702, the SWD Data Line signal 704, the SWD Data Line signal 706, the CAN Bus signal 708, the SWD Clock Output signal (SWD_CLK_OUT) 710, the SWD Data Line signal (SWDI_Out) 712, the SWD Enable signal (SWD0_EN) 714, the SWD Data Line signal (SWD0) 716, and the SSDP signal (SSDP_OUT) 718.

The acknowledge response phase is a three-bit (LSB-first) response from SWD target 108 to SWD host 106—corresponding to the period between time $T_1$ and time $T_2$. The period between time $T_0$ and time $T_1$ corresponds to the first turnaround period (Trn) between the packet request and acknowledge response phases. The period of time greater than time $T_2$ corresponds to the second turnaround period (Trn) between the acknowledge response and the data transfer phases. Here, a one-cycle turnaround period is shown between the packet request and acknowledge response phases, which is the default value.

The acknowledge response phase indicates to the SWD host 106 (i) a successful operation (i.e., OK response with a value of "001"), (ii) to retry the operation later (i.e., WAIT response with a value of "010"), or (iii) an error (i.e., FAULT response with a value of "100"). Here, the SWD Data Line signal 704 is indicating an OK response between time $T_1$ and time $T_2$.

The SWD Clock signal 702 is the clock signal and used as a reference signal. The SWD Data Line signal 704 is the data signal to be driven by SWD target 108. The SWD Data Line signal 706 is the data propagating on the data line of the application board 304. The SWD Data Line signal 704 and SWD Data Line signal 706 are based on the SWD protocol. The SWD Clock signal 702, the SWD Data Line signal 704, and the SWD Data Line signal 706 illustrate the conventional SWD transaction used in, for example, system 100. A strong pull-up on the application board 304 is used to pull the data line, on which the SWD Data Line signal 706 propagates, to the supply voltage (e.g., Vdd) when not being driven by either the SWD host 106 or the SWD target 108 (i.e., between time $T_0$ and time $T_1$).

The CAN Bus signal 708 is the signal propagating on the CAN Bus 322 based on the SSDP protocol. The value of the CAN Bus signal 708 between time $T_0$ and time $T_1$ (i.e., first turnaround period) is that of PWM logic high data signal (PWM-1) 406 and driven by the SSDP host 308. Between time $T_1$ and time $T_2$ (i.e., acknowledge response phase), in response to the SSDP target 316 detecting a high logic value for the SWD Enable signal (SWD0_EN) 714, generates the SWD Data Line signal (SWD0) 716 as an acknowledge signal on the CAN_Tx line of the CAN Bus 322. In response to the value on the SWD Data Line signal (SWD0) 716 being a high logic value, the SSDP target 316 continuously drives a PWM logic high data signal (PWM-1) 406 on the CAN_Tx line of the CAN Bus 322. In response to the value on the SWD Data Line signal (SWD0) 716 being a low logic value, the SSDP target 316 continuously drives a PWM logic low data signal (PWM-0) 426 on the CAN_Tx line of the CAN Bus 322. The CAN Bus 322 continuously toggles due to the PWM logic high data signal (PWM-1) 406 being continuously driven by the SSDP host 308. Thus, the CAN Rx line of the CAN Bus 322 continuously toggles, as shown in SWD Clock Output signal (SWD_CLK_OUT) 710, which is used as the SWD Clock Output signal from the SSDP target 316 to the SWD target 108.

The detecting of the logic high or logic low of the SWD Data Line signal (SWD0) 716 and driving the PWM logic low data signal (PWM-0) 426 by the SSDP target 316 is based on PWM encoding rules. To drive the PWM logic low data signal (PWM-0) 426, the counter values as shown in Table II, hereinabove. For the start of the driving of the PWM logic low data signal (PWM-0) 426, the values in column "Drive PWM-0 25%" of table II are used on the CAN_Tx line of the CAN Bus 322. For the stop of the driving of the PWM logic low data signal (PWM-0) 426, the values in column "Release PWM-0 75%" of table II are used on the CAN_Tx line of the CAN Bus 322.

Figure 8:
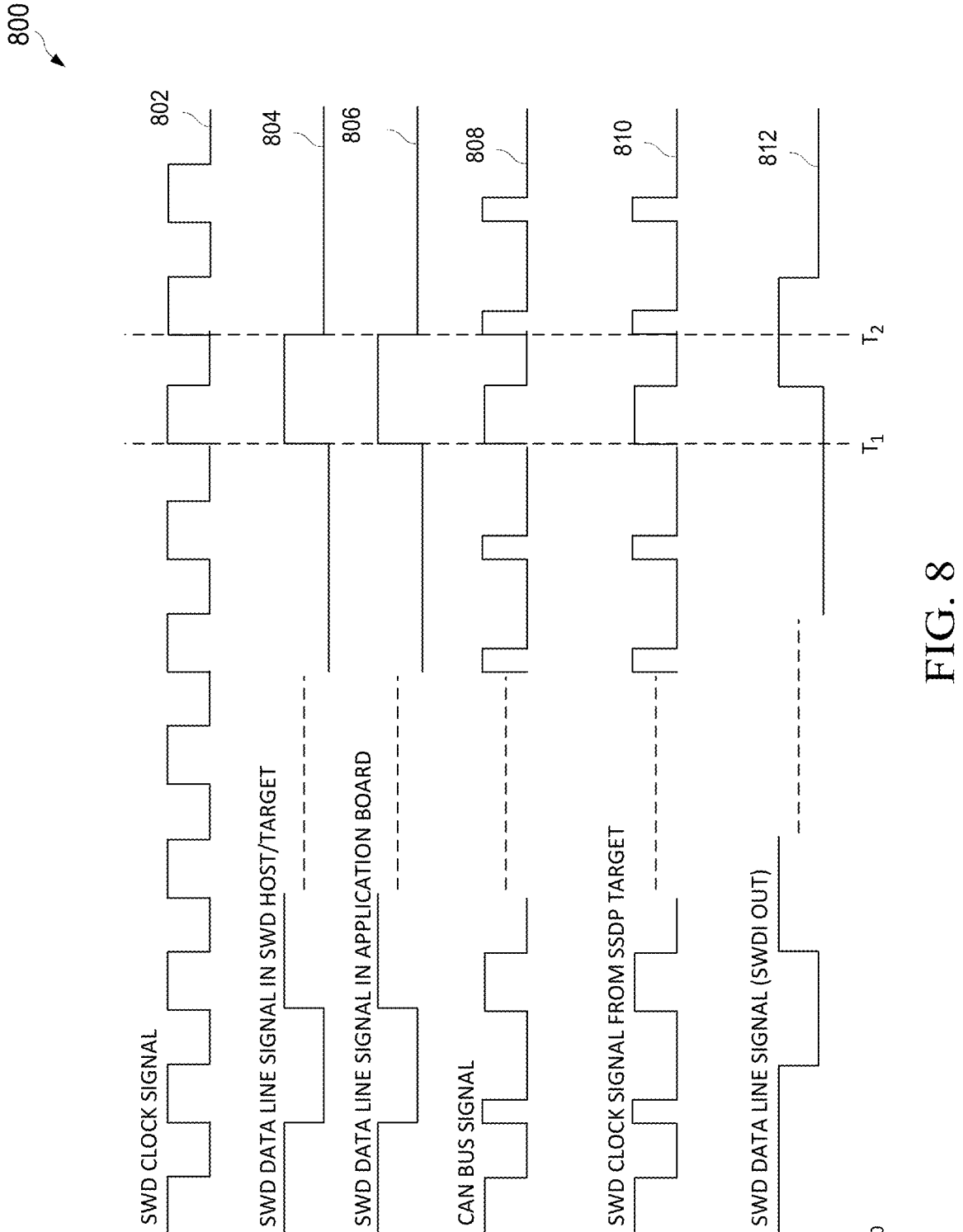
FIG. 8 is a timing diagram, an example of a PWM decoding of the SWD data transfer phase (i.e., write data sequence)

FIG. 8 illustrates timing diagram 800, an example of a PWM decoding of the SWD data transfer phase (i.e., write data sequence). The SWD host 106, upon successfully receiving an OK response from the SWD target 108 through the three-bit acknowledge response and after the second turnaround period (Trn), begins the data transfer to SWD target 108. The data transfer phase consists of 32 data bits (i.e., between time $T_0$ and time $T_1$) and 1 parity bit (between time $T_1$ and time $T_2$). The parity check is made over the 32 data bits. Following the parity check are two idle cycles (after time $T_1$) with a value of "o", as specified in the ARM SWD specification. The next SWD packet from the SWD host 106 is communicated after the idle cycles.

The timing diagram 800 includes a timing diagram for the SWD Clock signal 802, the SWD Data Line signal 804, the SWD Data Line signal 806, the CAN Bus signal 808, the SWD Clock Output signal (SWD_CLK_OUT) 810, and the SWD Data Line signal (SWDI_Out) 812. The CAN Bus signal 808 is the PWM encoded signal of the SWD Data Line signal 804 by the SSDP host 308.

During the data transfer phase, the SSDP target 316 uses the CAN_Rx (e.g., CAN_Rx0 and CAN_RX1) lines for the SWD Clock Output signal (SWD_CLK_OUT) 810 and performs, by the pulse width demodulator circuit 522, the decoding of the PWM encoded signals to generate the SWD Data Line Output signal (SWDI_Out) 812, which follows the SWD protocol.

The SSDP target 316 continuously drives a constant logic high signal on the CAN_Tx (e.g., CAN_Tx0 and CAN_Tx1) lines while it receives the data from the SSDP host 308 over the CAN_Rx (e.g., CAN_Rx0 and CAN_RX1) lines. The pulse width demodulator circuit 522 decodes the PWM encoded signal from the CAN_Rx (e.g., CAN_Rx0 and CAN_RX1) lines and converts the signal to the SWD Data Line signal (SWDI_Out) 812, which is communicated from the SSDP target 316 to the SWD target 108 through the fourth multiplexer 518. The SWD Data Line signal (SWDI_Out) 812 is a delayed signal of the SWD Data Line signal 804 due to the delay from the decoding of the PWM encoded signal by the SSDP target 316.

It is noted that similar waveforms for the SWD read and wait responses follow the same encoding and decoding of the PWM signal based on the SSDP protocol.

Figure 9:
FIG. 9 is a flow chart of an embodiment method for communicating between the SWD host and the SWD target using the SSDP protocol.
Figure 9:
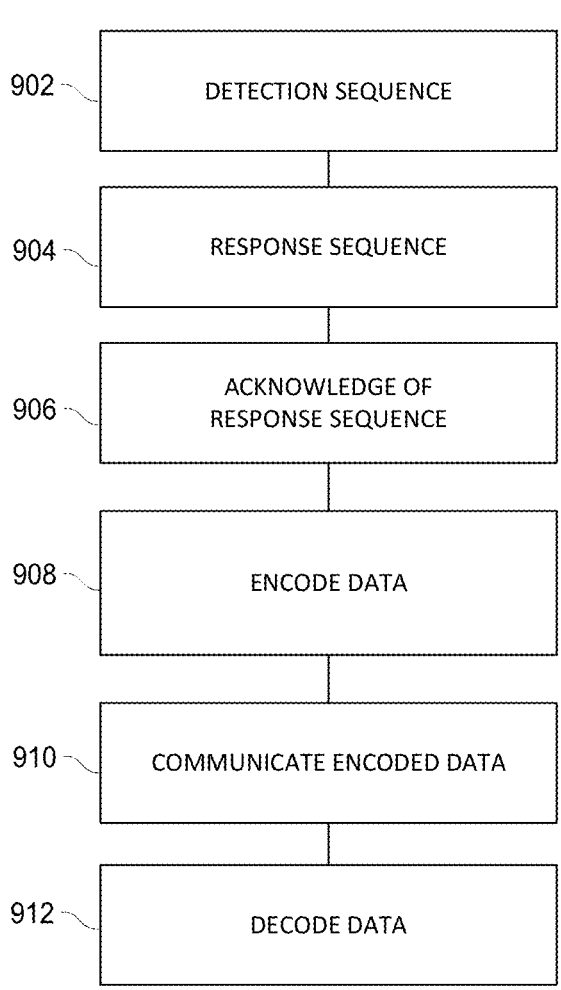

FIG. 9 illustrates a flow chart of an embodiment method 900 for communicating between the SWD host 106 and the SWD target 108 using the SSDP protocol as a bridge for transmitting PWM encoded signals over a single wire of the CAN Bus 322. To establish the SSDP link between the SWD host 106 and the SWD target 108, the SWD host 106 begins the activation sequence, which includes the steps 902, 904, and 906.

At step 902, in response to the SWD host 106 transmitting a set number of logic high PWM data signals (PWM-1), the SWD target 318 begins the detection sequence to detect the set number of logic high PWM data signals (PWM-1). At step 904, the SWD target 318, after detecting the set number of logic high PWM data signals (PWM-1), communicates a response signal during the response sequence. At step 906, the SWD host 106, upon receiving the response sequence and determining that the frequency period value in the response signal is valid, communicates an acknowledge of response during the acknowledge of response sequence. The successful completion of steps 902, 904, and 906, establish the SSDP link between the SSDP host 308 and the SSDP target 316. At step 908, the SSDP host 308 or the SSDP target 316 encode the data from the SWD host 306 or SWD target 318, respectively, using the SWD clock as a carrier of the pulse-width modulated signal. At step 910, the PWM encoded signal is communicated over a single wire of the CAN Bus 322. At step 912 The SSDP target 316 and the SSDP host 308 receive the PWM encoded signal and decode the signal and communicate the data to the SWD target 318 or the SWD host 306, respectively. It is noted that all steps outlined are not necessarily required and can be optional.

Figure 10:
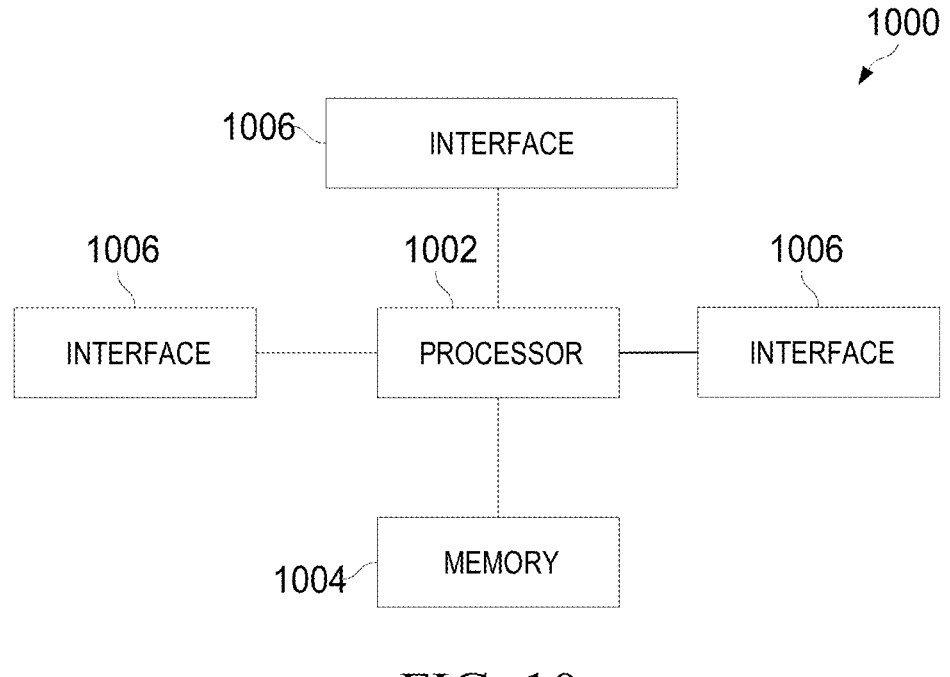
FIG. 10 illustrates a block diagram of an embodiment processing system.

FIG. 10 illustrates a block diagram of an embodiment processing system 1000. As shown, the processing system 1000 includes a processor 1002, a memory 1004, and an interface 1006, which may (or may not) be arranged as shown. In embodiments, the processing system 1000 may be coupled to the system-on-chip 312. The processing system 1000 may include additional components not depicted, such as long-term storage (e.g., non-volatile memory, etc.), measurement devices, and the like. Processor 1002 may be any component or collection of components adapted to perform computations or other processing related tasks, as disclosed herein. Memory 1004 may be any component or collection of components adapted to store programming or instructions for execution by the processor 1002. In an embodiment, memory 1004 includes a non-transitory computer-readable medium. Interface 1006 may be any component or collection of components that allow the processor 1002 to communicate with other devices/components or a user. For example, interface 1006 may be adapted to allow a user or device (e.g., personal computer (PC), etc.) to interact/communicate with the processing system 1000.

A first aspect relates to a circuit. The circuit includes a serial wire debug (SWD) target circuit configured to communicate SWD signals with an SWD host circuit of a debugging tool; and a single signal debug port (SSDP) target circuit coupled to the SWD target circuit. The SSDP target circuit configured to encode the SWD signals to SSDP signals for communication over a Controller Area Network (CAN) Bus between the circuit and the debugging tool or decode the SSDP signals received over the CAN Bus to the SWD signals. The SSDP signals are pulse-width modulation (PWM) encoded signals of the SWD signals. An SWD clock signal generated by the SWD host circuit is the carrier signal for the PWM encoded signals.

In a first implementation form of the circuit according to the first aspect as such, the SSDP target circuit is configured to transmit a response sequence to the debugging tool in response to detecting a set number of logic high PWM signals from an SSDP host circuit of the debugging tool. The response sequence includes an SWD clock frequency of the SWD clock signal.

In a second implementation form of the circuit according to the first aspect as such, or any preceding implementation form of the first aspect, the SSDP target circuit is configured to receive an acknowledge of response sequence from the SSDP host circuit to establish an SSDP link between the SSDP target circuit and the SSDP host circuit over the CAN Bus.

In a third implementation form of the circuit according to the first aspect as such, or any preceding implementation form of the first aspect, the decoded SSDP signals include the SWD clock signal and SWD data signals. The SSDP target circuit is configured to communicate the SWD clock signal and the SWD data signals to the SWD host circuit.

In a fourth implementation form of the circuit according to the first aspect as such, or any preceding implementation form of the first aspect, the SSDP signals are communicated over a single wire of the CAN Bus. The single wire of the CAN Bus is a differential pair type.

In a fifth implementation form of the circuit according to the first aspect as such, or any preceding implementation form of the first aspect, the SSDP signals communicated over the CAN Bus are transparent to the SWD target circuit.

In a sixth implementation form of the circuit according to the first aspect as such, or any preceding implementation form of the first aspect, the SSDP target circuit communicates with the debugging tool over the CAN Bus using CAN input/output (I/O) pins. The CAN I/O pins are used to communicate CAN communications with the circuit during a functional operation of the circuit.

In a seventh implementation form of the circuit according to the first aspect as such, or any preceding implementation form of the first aspect, the SSDP target circuit is configured to detect a consecutive number of logic high PWM signals. The detecting includes comparing sequential symbols received over the CAN Bus and determining that a set number of continuous logic high PWM signal have a same clock period and a same duty cycle. Receiving the set number of continuous logic high PWM signals corresponds to an activation sequence initiation by the debugging tool.

A second aspect relates to a method that includes establishing a single signal debug port (SSDP) link between a single signal debug port (SSDP) host circuit and an SSDP target circuit; encoding SSDP signals by the SSDP host circuit or the SSDP target circuit from a serial wire debug (SWD) host circuit or an SWD target circuit, respectively, wherein the SSDP signals are pulse-width modulation (PWM) encoded signals of SWD signals, wherein an SWD clock signal generated by the SWD host circuit is the carrier signal for the PWM encoded signals; communicating the SSDP signals between the SSDP host circuit and the SSDP target circuit over a Controller Area Network (CAN) Bus; and decoding the SSDP signals, by the SSDP target circuit or the SSDP host circuit, to SWD signals.

In a first implementation form of the method, according to the second aspect as such, the establishing the SSDP link includes transmitting, by the SSDP host circuit, a set number of logic high PWM signals to place CAN nodes coupled to the CAN Bus in a Bus-OFF state; transmitting, by the SSDP target circuit, a response sequence to the SSDP host circuit in response to detecting the set number of logic high PWM signals, wherein the response sequence comprises an SWD clock frequency of the SWD clock signal; and transmitting, by the SSDP host circuit, an acknowledge of response sequence from the SSDP host circuit to the SSDP target circuit to establish the SSDP link over the CAN Bus.

In a second implementation form of the method according to the second aspect as such, or any preceding implementation form of the second aspect, the SWD host circuit and the SSDP host circuit are circuits of a debugging tool used to debug a circuit comprising the SWD target circuit and the SSDP target circuit.

In a third implementation form of the method according to the second aspect as such, or any preceding implementation form of the second aspect, the SSDP signals are communicated over a single wire of the CAN Bus. The single wire of the CAN Bus is a differential pair type.

In a fourth implementation form of the method according to the second aspect as such, or any preceding implementation form of the second aspect, the SSDP signals are communicated over the CAN Bus using CAN input/output (I/O) pins. The CAN I/O pins are used to communicate CAN communications during a functional operation of a circuit comprising the SWD target circuit and the SSDP target circuit.

In a fifth implementation form of the method according to the second aspect as such, or any preceding implementation form of the second aspect, the SSDP signals communicated over the CAN Bus are transparent to the SWD target circuit and the SWD host circuit.

In a sixth implementation form of the method according to the second aspect as such, or any preceding implementation form of the second aspect, the method further includes transmitting, by the SSDP host circuit, a set number of PWM logic high signal symbols to reset the SSDP target circuit.

A third aspect relates to a system includes a debugging tool and an application board. The debugging tool includes a serial wire debug (SWD) host coupled to a single signal debug port (SSDP) host. The application board includes an SWD target coupled to an SSDP target. The SWD target is configured to communicate SWD signals with the SWD host. The SSDP target is configured to encode the SWD signals to SSDP signals for communication over a Controller Area Network (CAN) Bus between the application board and the debugging tool. The SSDP signals are pulse-width modulation (PWM) encoded signals of the SWD signals. An SWD clock signal generated by the SWD host is the carrier signal for the PWM encoded signals. The SSDP target is configured to decode the SSDP signals received from the SSDP host over the CAN Bus to the SWD signals.

In a first implementation form of the system, according to the third aspect as such, the SSDP target circuit is configured to transmit a response sequence to the debugging tool in response to detecting a set number of logic high PWM signals from the SSDP host circuit. The response sequence includes an SWD clock frequency of the SWD clock signal.

In a second implementation form of the system according to the third aspect as such, or any preceding implementation form of the third aspect, the SSDP target circuit is configured to receive an acknowledge of response sequence from the SSDP host circuit to establish an SSDP link between the SSDP target circuit and the SSDP host circuit over the CAN Bus.

In a second implementation form of the system according to the third aspect as such, or any preceding implementation form of the third aspect, the SSDP host circuit is configured to transmit a set number of logic high PWM signals or transmit multiple CAN messages having errors to place CAN nodes coupled to the CAN Bus in a Bus-OFF state.

In a third implementation form of the system according to the third aspect as such, or any preceding implementation form of the third aspect, the SSDP signals are communicated over a single wire of the CAN Bus. The single wire of the CAN Bus is a differential pair type.

In a fourth implementation form of the system according to the third aspect as such, or any preceding implementation form of the third aspect, the decoded SSDP signals include the SWD clock signal and SWD data signals. The SSDP target circuit is configured to communicate the SWD clock signal and the SWD data signals to the SWD host circuit.

A fourth aspect relates to a first circuit for communicating serial wire debug (SWD) signals over a Controller Area Network (CAN) Bus, the first circuit includes a non-transitory memory storage comprising instructions; and a processor in communication with the non-transitory memory storage, wherein the instructions, when executed by the processor, cause the processor to: transmit an activation sequence comprising a consecutive set number of logic high pulse-width modulation (PWM) signals or multiple CAN messages having errors over the CAN Bus, the transmitting resulting in CAN nodes coupled to the first circuit via the CAN Bus to transition to a Bus-OFF state, and receive a response sequence over the CAN Bus from a second circuit coupled to the first circuit upon successful activation of the activation sequence, the response sequence comprising a signal pattern of "0000_1111_0000_1111_0000_11" followed by a frequency period value of the last cycle of the activation sequence.

In a first implementation form of the first circuit, according to the fourth aspect as such, the instructions, when executed by the processor, cause the processor to decode the response sequence and compare the frequency period value from the response sequence to a period of a clock signal used to generate the activation sequence; and determine a successful activation sequence transmission from the first circuit to the second circuit in response to a result of the comparison being within a threshold.

In a second implementation form of the first circuit according to the fourth aspect as such, or any preceding implementation form of the fourth aspect, the instructions, when executed by the processor, cause the processor to transmit an acknowledge of response sequence over the CAN Bus to the second circuit, the acknowledge of response sequence comprising a signal pattern of "0000_1111_0000_1111_0000_11", immediately followed by the frequency period value, and subsequently followed by the signal pattern of "1111_1111".

In a third implementation form of the first circuit according to the fourth aspect as such, or any preceding implementation form of the fourth aspect, an optional signal pattern is included in the acknowledge of response sequence between the frequency period value and the signal pattern of "1111_1111".

In a fourth implementation form of the first circuit according to the fourth aspect as such, or any preceding implementation form of the fourth aspect, a signal length of the optional signal pattern is set such that the CAN nodes remain in the Bus-OFF state.

In a fifth implementation form of the first circuit according to the fourth aspect as such, or any preceding implementation form of the fourth aspect, the instructions, when executed by the processor, cause the processor to transmit an abort of the acknowledge of response sequence comprising an abort signal pattern between the frequency period value and the signal pattern of "1111_1111".

In a sixth implementation form of the first circuit according to the fourth aspect as such, or any preceding implementation form of the fourth aspect, the instructions, when executed by the processor, cause the processor to transmit an additional signal after the acknowledge of response sequence having a signal pattern of "1111_0000" or "1111_1111_1111_0000" indicating to the second circuit to enable a data line between components of the second circuit to communicate the SWD signals between the first circuit and the second circuit using single signal debug port (SSDP) signals over the CAN Bus, wherein the "0000" pattern in the additional signal instructs the data line to be set to a value of "o", and wherein transmission of a logic high PWM signal after the additional signal initiates transmission of SWD signal communications to the second circuit.

A fifth aspect relates to a first circuit for communicating serial wire debug (SWD) signals over a Controller Area Network (CAN) Bus, the first circuit includes a non-transitory memory storage comprising instructions; and a processor in communication with the non-transitory memory storage, wherein the instructions, when executed by the processor, cause the processor to: receive an activation sequence from a second circuit, the activation sequence comprising a consecutive set number of logic high pulse-width modulation (PWM) signals or multiple CAN messages having errors over the CAN Bus, the activation sequence resulting in CAN nodes coupled to the second circuit via the CAN Bus to transition to a Bus-OFF state, and transmit a response sequence over the CAN Bus to the second circuit coupled to the first circuit upon successful activation of the activation sequence, the response sequence comprising a signal pattern of "0000_1111_0000_1111_0000_11" followed by a frequency period value of the last cycle of the activation sequence.

In a first implementation form of the first circuit, according to the fifth aspect as such, wherein the instructions, when executed by the processor, cause the processor to: determine whether each logic high pulse-width modulation (PWM) signal in the consecutive set number of logic high pulse-width modulation (PWM) signals has the same clock period and duty cycle; and transmit the response sequence in response to determining that the set number of logic high pulse-width modulation (PWM) signals have the same clock period and duty cycle within a given threshold.

In a second implementation form of the first circuit according to the fifth aspect as such, or any preceding implementation form of the fifth aspect, the instructions, when executed by the processor, cause the processor to receive an acknowledge of response sequence over the CAN Bus from the second circuit, the acknowledge of response sequence comprising a signal pattern of "0000_1111_0000_1111_0000_11", immediately followed by the frequency period value, and subsequently followed by the signal pattern of "1111_1111".

In a third implementation form of the first circuit according to the fifth aspect as such, or any preceding implementation form of the fifth aspect, an optional signal pattern is included in the acknowledge of response sequence between the frequency period value and the signal pattern of "1111_1111".

In a fourth implementation form of the first circuit according to the fifth aspect as such, or any preceding implementation form of the fifth aspect, a signal length of the optional signal pattern is set such that the CAN nodes remain in the Bus-OFF state.

In a fifth implementation form of the first circuit according to the fifth aspect as such, or any preceding implementation form of the fifth aspect, the instructions, when executed by the processor, cause the processor to receive an abort of the acknowledge of response sequence comprising an abort signal pattern between the frequency period value and the signal pattern of "1111_1111".

In a sixth implementation form of the first circuit according to the fifth aspect as such, or any preceding implementation form of the fifth aspect, the instructions, when executed by the processor, cause the processor to receive an additional signal after the acknowledge of response sequence having a signal pattern of "1111_0000" or "1111_1111_1111_0000" indicating to the first circuit to enable a data line between components of the first circuit to communicate the SWD signals between the first circuit and the second circuit using single signal debug port (SSDP) signals over the CAN Bus.

A sixth aspect relates to a method for communicating serial wire debug (SWD) signals over a Controller Area Network (CAN) Bus, includes communicating, between a first circuit to a second circuit over the CAN Bus, an activation sequence comprising a consecutive set number of logic high pulse-width modulation (PWM) signals or multiple CAN messages having errors over the CAN Bus, the communicating resulting in CAN nodes coupled to the first circuit via the CAN Bus to transition to a Bus-OFF state; and communicating, between the first circuit and the second circuit over the CAN Bus, a response sequence upon successful activation of the activation sequence, the response sequence comprising a signal pattern of "0000_1111_0000_1111_0000_11" followed by a frequency period value of the last cycle of the activation sequence.

In a first implementation form of the method, according to the sixth aspect as such, the method further includes decoding, by the first circuit, the response sequence and comparing the frequency period value from the response sequence to a period of a clock signal used to generate the activation sequence; and determining a successful activation sequence communication in response to a result of the comparison being within a threshold.

In a second implementation form of the method according to the sixth aspect as such, or any preceding implementation form of the sixth aspect, the method further includes determining whether each logic high pulse-width modulation (PWM) signal in the consecutive set number of logic high pulse-width modulation (PWM) signals has the same clock period and duty cycle; and communicating, between the first circuit and the second circuit over the CAN Bus, the response sequence in response to determining that the set number of logic high pulse-width modulation (PWM) signals have the same clock period and duty cycle within a given threshold.

In a third implementation form of the method according to the sixth aspect as such, or any preceding implementation form of the sixth aspect, the method further includes communicating, between the first circuit and the second circuit over the CAN Bus, an acknowledge of response sequence comprising a signal pattern of "0000_1111_0000_1111_0000_11", immediately followed by the frequency period value, and subsequently followed by the signal pattern of "1111_1111".

In a fourth implementation form of the method according to the sixth aspect as such, or any preceding implementation form of the sixth aspect, an optional signal pattern is included in the acknowledge of response sequence between the frequency period value and the signal pattern of "1111_1111", and wherein a signal length of the optional signal pattern is set such that the CAN nodes remain in the Bus-OFF state.

In a fifth implementation form of the method according to the sixth aspect as such, or any preceding implementation form of the sixth aspect, the method further includes communicating, between the first circuit and the second circuit over the CAN Bus, an additional signal after the acknowledge of response sequence having a signal pattern of "1111_0000" or "1111_1111_1111_0000" indicating to the second circuit to enable a data line between components of the second circuit to communicate the SWD signals between the first circuit and the second circuit using single signal debug port (SSDP) signals over the CAN Bus.

A seventh aspect relates to a first circuit for communicating serial wire debug (SWD) signals over a Controller Area Network (CAN) Bus, the first circuit configured to transmit an activation sequence comprising a consecutive set number of logic high pulse-width modulation (PWM) signals or multiple CAN messages having errors over the CAN Bus, the transmitting resulting in CAN nodes coupled to the first circuit via the CAN Bus to transition to a Bus-OFF state; and receive a response sequence over the CAN Bus from a second circuit coupled to the first circuit upon successful activation of the activation sequence, the response sequence comprising a signal pattern of "0000_1111_0000_1111_0000_11" followed by a frequency period value of the last cycle of the activation sequence.

An eighth aspect relates to a first circuit for communicating serial wire debug (SWD) signals over a Controller Area Network (CAN) Bus, the first circuit configured to receive an activation sequence from a second circuit, the activation sequence comprising a consecutive set number of logic high pulse-width modulation (PWM) signals or multiple CAN messages having errors over the CAN Bus, the activation sequence resulting in CAN nodes coupled to the second circuit via the CAN Bus to transition to a Bus-OFF state; and transmit a response sequence over the CAN Bus to the second circuit coupled to the first circuit upon successful activation of the activation sequence, the response sequence comprising a signal pattern of "0000_1111_0000_1111_0000_11" followed by a frequency period value of the last cycle of the activation sequence.

In a first implementation form of the first circuit, the first circuit is configured to transmit an abort of an acknowledge of response sequence over the CAN Bus to the second circuit, the abort of the acknowledge of response sequence comprising a signal pattern of "0000_1111_0000_1111_0000_11", immediately followed by the frequency period value, and subsequently followed by the signal pattern of "xxxx_xxxx", wherein at least one of the x values is a logic low PWM signal, and wherein any other x value is either a logic high PWM signal or a logic low PWM signal.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure. Further, changes to the arrangement of the steps, removal of one or more steps and path connections, and addition of steps and path connections are similarly contemplated.

What is claimed is:

1. A first circuit for communicating serial wire debug (SWD) signals over a Controller Area Network (CAN) Bus, the first circuit comprising:
   a non-transitory memory storage comprising instructions; and
   a processor in communication with the non-transitory memory storage, wherein the instructions, when executed by the processor, cause the processor to:
      transmit an activation sequence comprising a consecutive set number of logic high pulse-width modulation (PWM) signals or multiple CAN messages having errors over the CAN Bus, the transmitting resulting in CAN nodes coupled to the first circuit via the CAN Bus to transition to a Bus-OFF state, and
      receive a response sequence over the CAN Bus from a second circuit coupled to the first circuit upon successful activation of the activation sequence, the response sequence comprising a signal pattern of "0000_1111_0000_1111_0000_11" followed by a frequency period value of the last cycle of the activation sequence.

2. The first circuit of claim 1, wherein the instructions, when executed by the processor, cause the processor to:
decode the response sequence and compare the frequency period value from the response sequence to a period of a clock signal used to generate the activation sequence; and
determine a successful activation sequence transmission from the first circuit to the second circuit in response to a result of the comparison being within a threshold.

3. The first circuit of claim 2, wherein the instructions, when executed by the processor, cause the processor to transmit an acknowledge of response sequence over the CAN Bus to the second circuit, the acknowledge of response sequence comprising a signal pattern of "0000_1111_0000_1111_0000_11", immediately followed by the frequency period value, and subsequently followed by the signal pattern of "1111_1111".

4. The first circuit of claim 3, wherein an optional signal pattern is included in the acknowledge of response sequence between the frequency period value and the signal pattern of "1111_1111".

5. The first circuit of claim 4, wherein a signal length of the optional signal pattern is set such that the CAN nodes remain in the Bus-OFF state.

6. The first circuit of claim 3, wherein the instructions, when executed by the processor, cause the processor to transmit an abort of the acknowledge of response sequence comprising an abort signal pattern between the frequency period value and the signal pattern of "1111_1111".

7. The first circuit of claim 3, wherein the instructions, when executed by the processor, cause the processor to transmit an additional signal after the acknowledge of response sequence having a signal pattern of "1111_0000" or "1111_1111_1111_0000" indicating to the second circuit to enable a data line between components of the second circuit to communicate the SWD signals between the first circuit and the second circuit using single signal debug port (SSDP) signals over the CAN Bus, wherein the "0000" pattern in the additional signal instructs the data line to be set to a value of "0", and wherein transmission of a logic high PWM signal after the additional signal initiates transmission of SWD signal communications to the second circuit.

8. A first circuit for communicating serial wire debug (SWD) signals over a Controller Area Network (CAN) Bus, the first circuit comprising:
a non-transitory memory storage comprising instructions; and
a processor in communication with the non-transitory memory storage, wherein the instructions, when executed by the processor, cause the processor to:
receive an activation sequence from a second circuit, the activation sequence comprising a consecutive set number of logic high pulse-width modulation (PWM) signals or multiple CAN messages having errors over the CAN Bus, the activation sequence resulting in CAN nodes coupled to the second circuit via the CAN Bus to transition to a Bus-OFF state, and
transmit a response sequence over the CAN Bus to the second circuit coupled to the first circuit upon successful activation of the activation sequence, the response sequence comprising a signal pattern of "0000_1111_0000_1111_0000_11" followed by a frequency period value of the last cycle of the activation sequence.

9. The first circuit of claim 8, wherein the instructions, when executed by the processor, cause the processor to:
determine whether each logic high pulse-width modulation (PWM) signal in the consecutive set number of logic high pulse-width modulation (PWM) signals has the same clock period and duty cycle; and
transmit the response sequence in response to determining that the set number of logic high pulse-width modulation (PWM) signals have the same clock period and duty cycle within a given threshold.

10. The first circuit of claim 8, wherein the instructions, when executed by the processor, cause the processor to receive an acknowledge of response sequence over the CAN Bus from the second circuit, the acknowledge of response sequence comprising a signal pattern of "0000_1111_0000_1111_0000_11", immediately followed by the frequency period value, and subsequently followed by the signal pattern of "1111_1111".

11. The first circuit of claim 10, wherein an optional signal pattern is included in the acknowledge of response sequence between the frequency period value and the signal pattern of "1111_1111".

12. The first circuit of claim 11, wherein a signal length of the optional signal pattern is set such that the CAN nodes remain in the Bus-OFF state.

13. The first circuit of claim 10, wherein the instructions, when executed by the processor, cause the processor to receive an abort of the acknowledge of response sequence comprising an abort signal pattern between the frequency period value and the signal pattern of "1111_1111".

14. The first circuit of claim 10, wherein the instructions, when executed by the processor, cause the processor to receive an additional signal after the acknowledge of response sequence having a signal pattern of "1111_0000" or "1111_1111_1111_0000" indicating to the first circuit to enable a data line between components of the first circuit to communicate the SWD signals between the first circuit and the second circuit using single signal debug port (SSDP) signals over the CAN Bus.

15. A method for communicating serial wire debug (SWD) signals over a Controller Area Network (CAN) Bus, comprising:
communicating, between a first circuit and a second circuit over the CAN Bus, an activation sequence comprising a consecutive set number of logic high pulse-width modulation (PWM) signals or multiple CAN messages having errors over the CAN Bus, the communicating resulting in CAN nodes coupled to the first circuit via the CAN Bus to transition to a Bus-OFF state; and
communicating, between the first circuit and the second circuit over the CAN Bus, a response sequence upon successful activation of the activation sequence, the response sequence comprising a signal pattern of "0000_1111_0000_1111_0000_11" followed by a frequency period value of the last cycle of the activation sequence.

16. The method of claim 15, further comprising:
decoding, by the first circuit, the response sequence and comparing the frequency period value from the response sequence to a period of a clock signal used to generate the activation sequence; and determining a successful activation sequence communication in response to a result of the comparison being within a threshold.

17. The method of claim 15, further comprising:

determining whether each logic high pulse-width modulation (PWM) signal in the consecutive set number of logic high pulse-width modulation (PWM) signals has the same clock period and duty cycle; and communicating, between the first circuit and the second circuit over the CAN Bus, the response sequence in response to determining that the set number of logic high pulse-width modulation (PWM) signals have the same clock period and duty cycle within a given threshold.

18. The method of claim 15, further comprising communicating, between the first circuit and the second circuit over the CAN Bus, an acknowledge of response sequence comprising a signal pattern of "0000_1111_0000_1111_0000_11", immediately followed by the frequency period value, and subsequently followed by the signal pattern of "1111_1111".

19. The method of claim 18, wherein an optional signal pattern is included in the acknowledge of response sequence between the frequency period value and the signal pattern of "1111_1111", and wherein a signal length of the optional signal pattern is set such that the CAN nodes remain in the Bus-OFF state.

20. The method of claim 18, further comprising communicating, between the first circuit and the second circuit over the CAN Bus, an additional signal after the acknowledge of response sequence having a signal pattern of "1111_0000" or "1111_1111_1111_0000" indicating to the second circuit to enable a data line between components of the second circuit to communicate the SWD signals between the first circuit and the second circuit using single signal debug port (SSDP) signals over the CAN Bus.

* * * * *